US011485341B2

(12) United States Patent
Hayes et al.

(10) Patent No.: US 11,485,341 B2
(45) Date of Patent: Nov. 1, 2022

(54) ELECTRONIC PARK BRAKE INTERFACE MODULE, PARK BRAKE CONTROLLER AND SYSTEM

(71) Applicant: Bendix Commercial Vehicle Systems LLC, Elyria, OH (US)

(72) Inventors: Thomas J. Hayes, Lakewood, OH (US); Michael D. Cremona, Elyria, OH (US); Steven C. Schapel, Elyria, OH (US); William Plow, Avon Lake, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 111 days.

(21) Appl. No.: 17/168,628

(22) Filed: Feb. 5, 2021

(65) Prior Publication Data

US 2021/0155217 A1 May 27, 2021

Related U.S. Application Data

(63) Continuation-in-part of application No. 15/713,614, filed on Sep. 23, 2017, now Pat. No. 11,161,484, (Continued)

(51) Int. Cl.
*B60T 17/22* (2006.01)
*B60T 7/08* (2006.01)
(Continued)

(52) U.S. Cl.
CPC .............. *B60T 17/22* (2013.01); *B60T 7/085* (2013.01); *B60K 2370/131* (2019.05);
(Continued)

(58) Field of Classification Search
CPC ........ B60T 17/22; B60T 7/085; B60T 13/662; B60T 13/683; B60K 2370/131; G05G 1/04
See application file for complete search history.

(56) References Cited

U.S. PATENT DOCUMENTS 3,816,677 A 6/1974 Soltez
4,549,050 A 10/1985 Lang
(Continued)

FOREIGN PATENT DOCUMENTS

DE 201 05 470 U1 7/2001
DE 10 2007 025 814 A1 12/2008
(Continued)

OTHER PUBLICATIONS

United States Office Action issued in U.S. Appl. No. 15/275,396 dated Nov. 1, 2018 (11 pages).
(Continued)

*Primary Examiner* — Mathew Franklin Gordon
(74) *Attorney, Agent, or Firm* — Crowell & Moring LLP

(57) ABSTRACT

Various examples of park brake interface modules which are utilized as human machine interfaces (HMI) in vehicles are provided. In one example, a park brake interface module for a vehicle includes a park brake switch device to actuate the park brake. The park brake switch device is capable of actuating the vehicle park brake in a brake apply mode upon receipt of a pinch signal. In another example, the park brake interface module includes a park brake switch device which is capable of actuating the vehicle park brake in a brake release mode upon receipt of a reach signal. In a further example, the park brake interface module includes recessed fixed parking brake actuation switches. In operation, the electronic interface module and park brake switch devices allow the operator to apply or release the vehicle park brakes according to memorable mnemonics, for example, "pinch to park" and "reach to release."

20 Claims, 23 Drawing Sheets

Related U.S. Application Data which is a continuation-in-part of application No. 15/275,396, filed on Sep. 24, 2016, now abandoned.

(51) Int. Cl.

| | | |
|---|---|---|
| G05G 1/04 | (2006.01) | |
| B60T 13/68 | (2006.01) | |
| B60T 13/66 | (2006.01) | |

(52) U.S. Cl.
CPC ........... *B60T 13/662* (2013.01); *B60T 13/683* (2013.01); *G05G 1/04* (2013.01)

(56) References Cited

U.S. PATENT DOCUMENTS

| | | |
|---|---|---|
| 4,790,208 A | 12/1988 | Johnson |
| 4,844,553 A | 7/1989 | Bliss |
| 5,365,791 A | 11/1994 | Padula et al. |
| 5,439,275 A | 8/1995 | Padula et al. |
| 5,485,141 A | 1/1996 | Gregory |
| 5,675,190 A | 10/1997 | Morita |
| 6,450,587 B1 | 9/2002 | MacGregor et al. |
| 6,545,852 B1 | 4/2003 | Arnold |
| D485,794 S | 1/2004 | Kemer et al. |
| 6,812,415 B1 | 11/2004 | Priesemuth |
| D499,677 S | 12/2004 | Kemer et al. |
| 7,071,435 B2 | 7/2006 | Altmann |
| 7,164,335 B2 | 1/2007 | Forsythe |
| 8,550,426 B2 | 10/2013 | Johnson et al. |
| D708,153 S | 7/2014 | Todd |
| 8,789,439 B2 | 7/2014 | Tovar et al. |
| 8,795,136 B2 | 8/2014 | Bensch et al. |
| 8,935,069 B2 | 1/2015 | Zula et al. |
| 8,997,966 B2 | 4/2015 | Yamada |
| 9,308,861 B2 | 4/2016 | Basiri et al. |
| 2003/0042120 A1 | 3/2003 | Seki |
| 2005/0017575 A1 | 1/2005 | Cormier |
| 2005/0023888 A1 | 2/2005 | Knight |
| 2005/0029859 A1 | 2/2005 | Bensch et al. |
| 2007/0225890 A1 | 9/2007 | Ringlstetter |
| 2014/0041973 A1 | 2/2014 | Zula et al. |
| 2014/0113271 A1 | 4/2014 | Elder |
| 2014/0123803 A1 | 5/2014 | Yamada |
| 2014/0309900 A1 | 10/2014 | Frashure et al. |
| 2015/0251639 A1 | 9/2015 | Sautter et al. |
| 2016/0103499 A1 | 4/2016 | Yamamoto et al. |
| 2017/0038891 A1 | 2/2017 | Lee et al. |
| 2018/0086322 A1 | 3/2018 | Zula et al. |
| 2020/0210003 A1 | 7/2020 | Hong et al. |

FOREIGN PATENT DOCUMENTS

| | | |
|---|---|---|
| DE | 10 2008 064 077 A1 | 7/2010 |
| DE | 10 2012 014 883 B3 | 1/2014 |
| EP | 0 149 070 A2 | 7/1985 |
| EP | 0 152 816 B1 | 4/1987 |
| EP | 0 171 569 B1 | 9/1987 |
| EP | 1 997 700 A2 | 12/2008 |
| EP | 2 045 157 A2 | 4/2009 |
| EP | 1 509 434 B1 | 8/2010 |
| EP | 1 997 700 B1 | 7/2011 |
| JP | 2004-66875 A | 3/2004 |
| JP | 2010-143542 A | 7/2010 |
| JP | 2019-69696 A | 5/2019 |
| KR | 10-2004-0052401 | 6/2004 |
| WO | WO 2014/016225 A1 | 1/2014 |
| WO | WO 2019/060292 A1 | 3/2019 |

OTHER PUBLICATIONS

International Search Report (PCT/ISA/210) issued in PCT Application No. PCT/US2017/052850 dated Feb. 5, 2018 (four (4) pages).

Written Opinion (PCT/ISA/237) issued in PCT Application No. PCT/US2017/052850 dated Feb. 5, 2018 (six (6) pages).

International Search Report (PCT/ISA/210) issued in PCT Application No. PCT/US2018/051495 dated Dec. 6, 2018 (three (3) pages).

Written Opinion (PCT/ISA/237) issued in PCT Application No. PCT/US2018/051495 dated Dec. 6, 2018 (seven (7) pages).

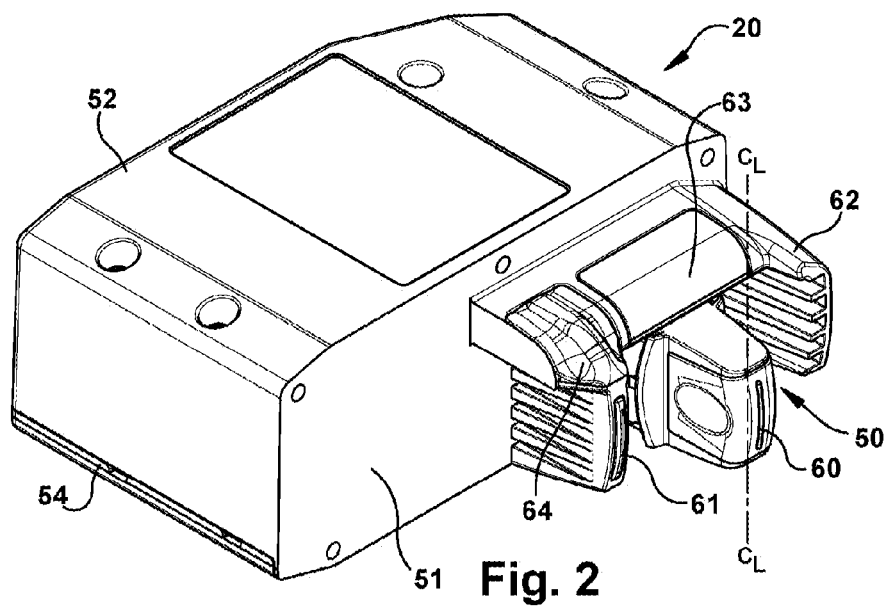

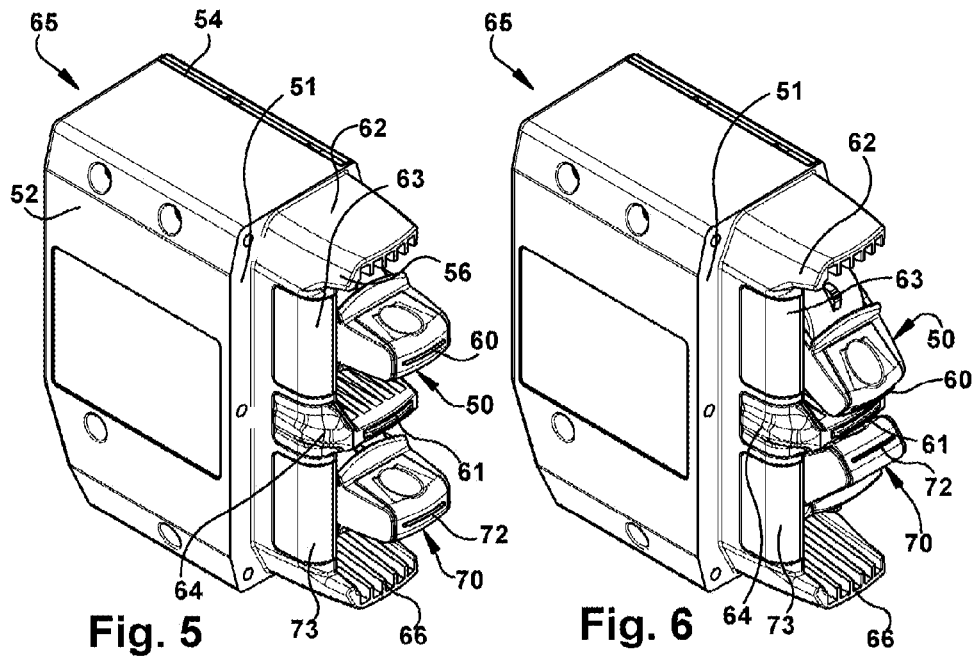
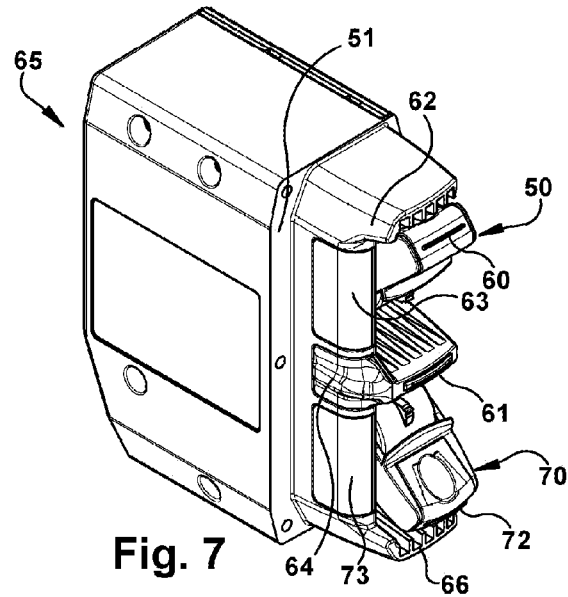

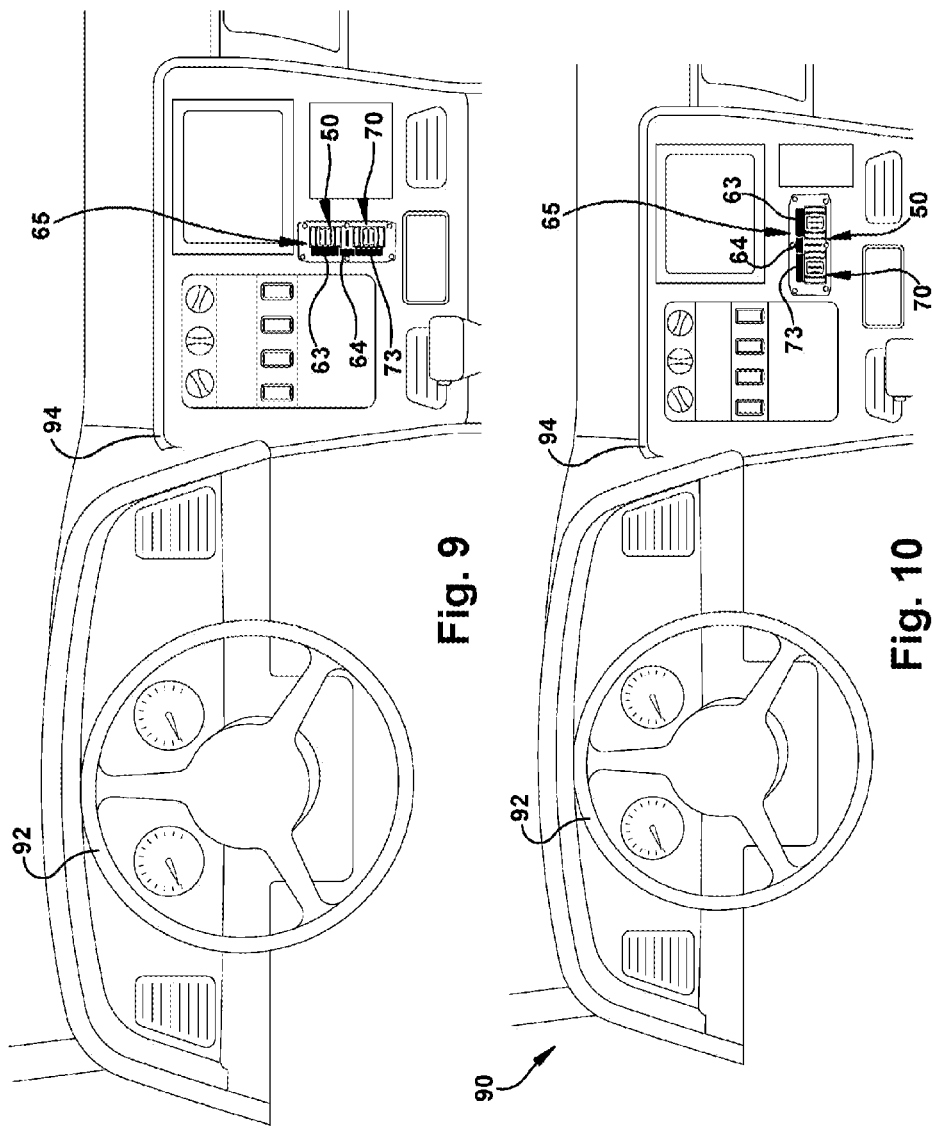

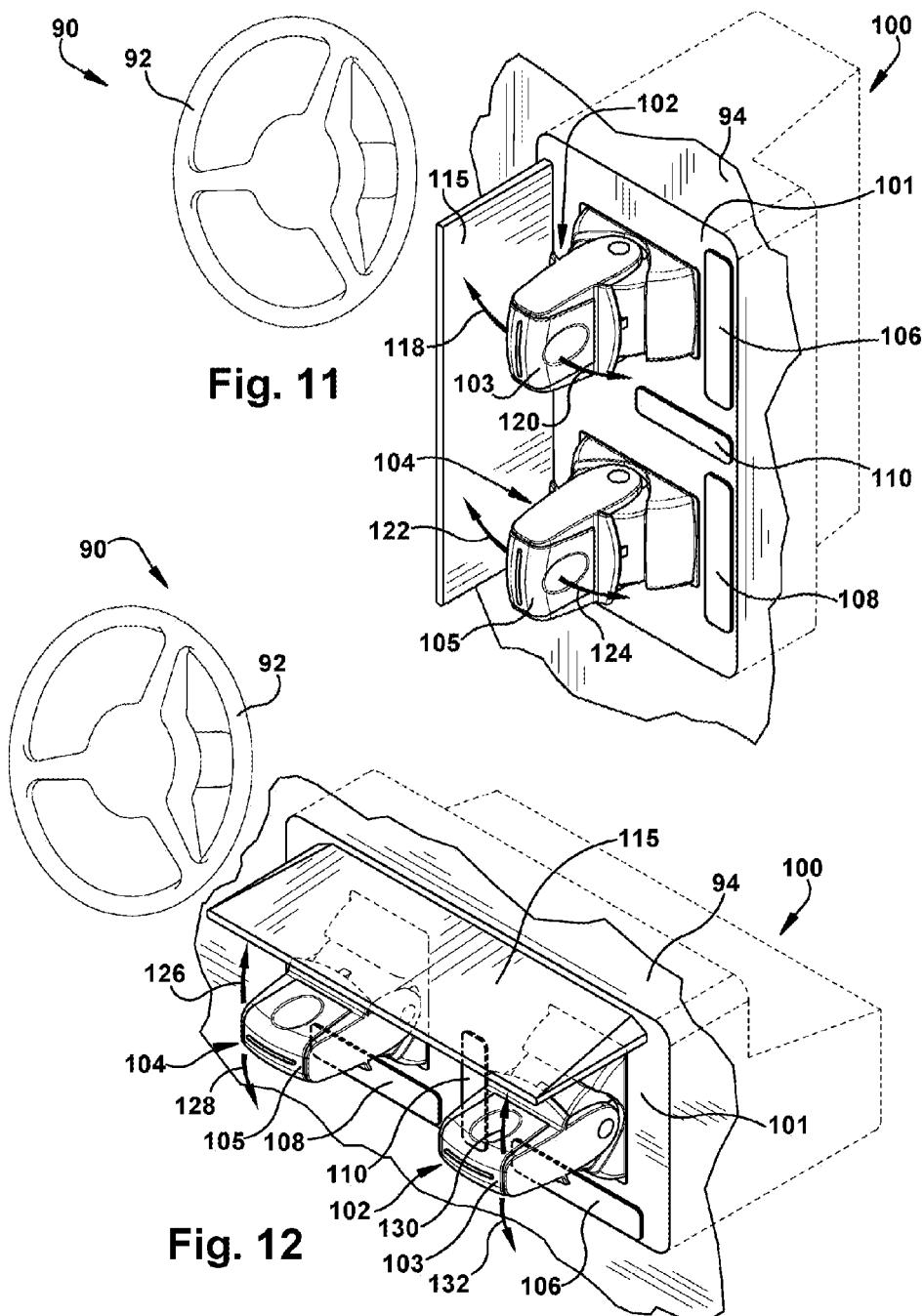

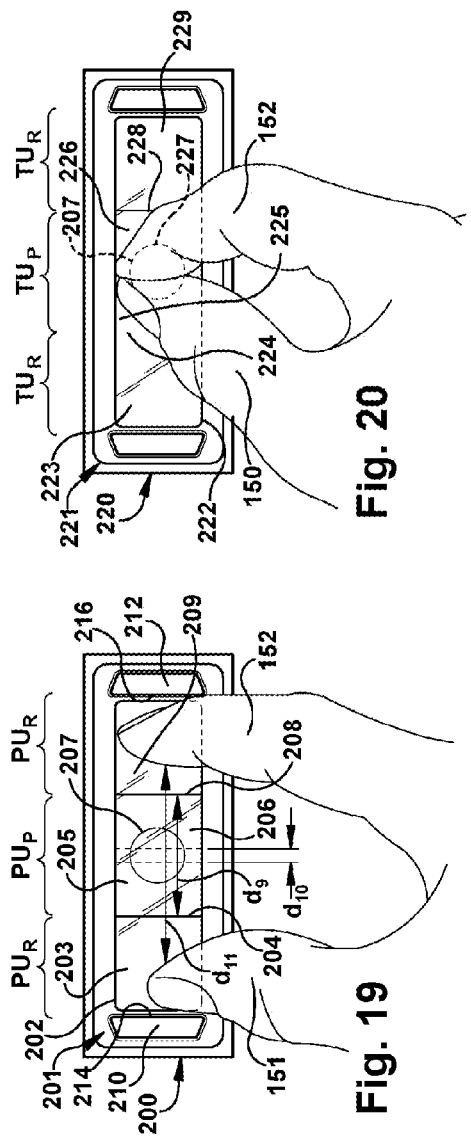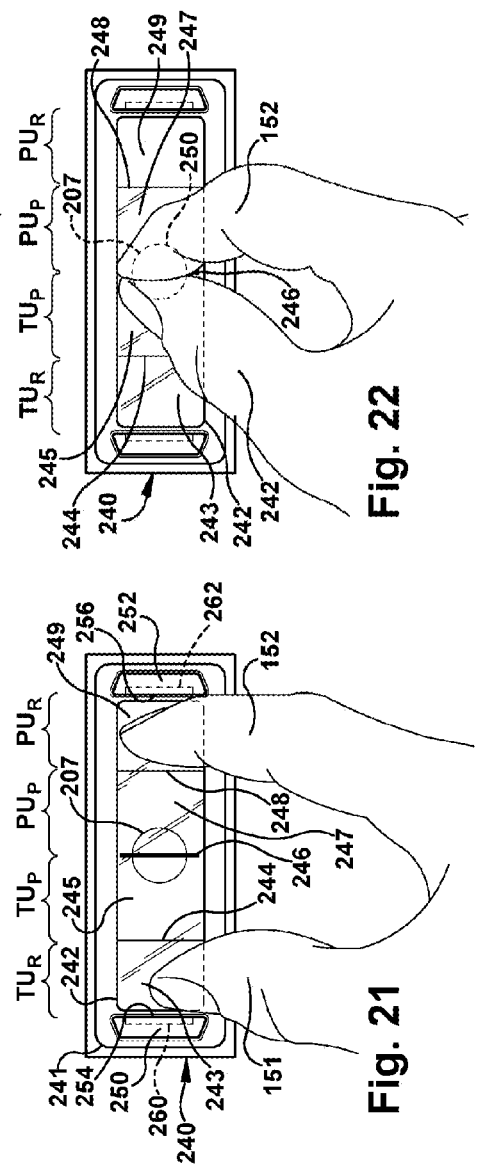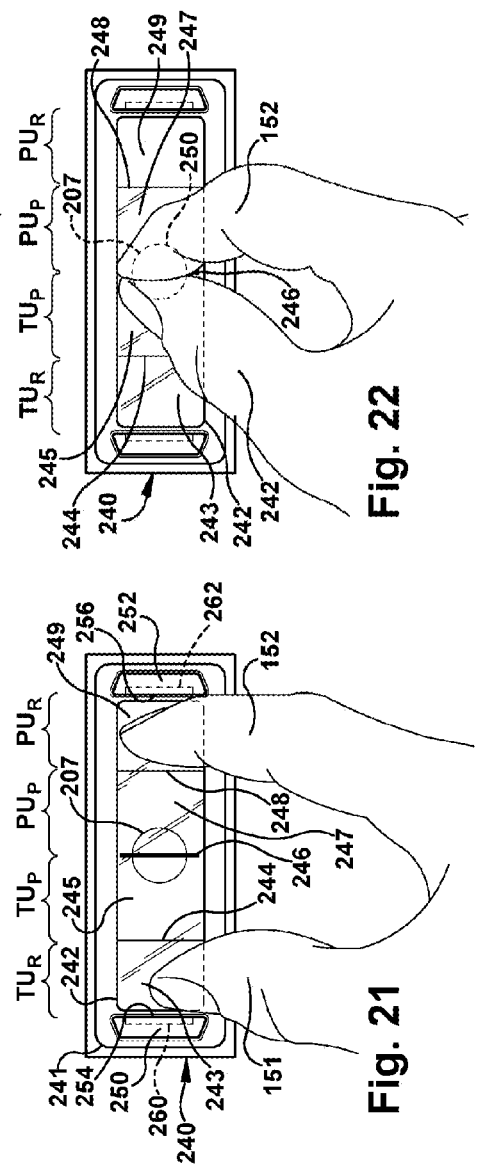

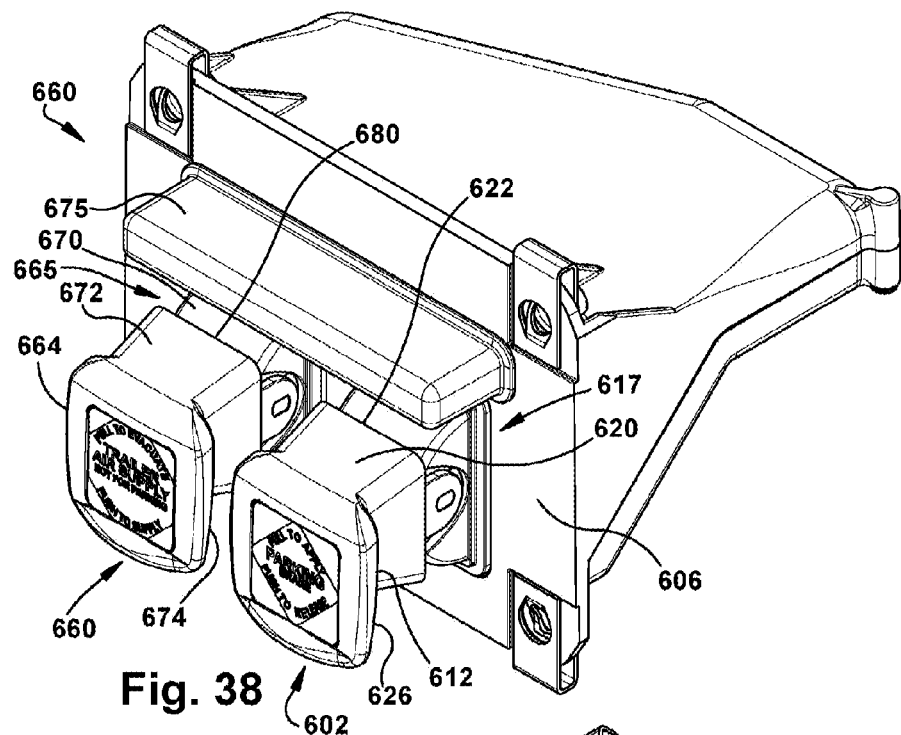
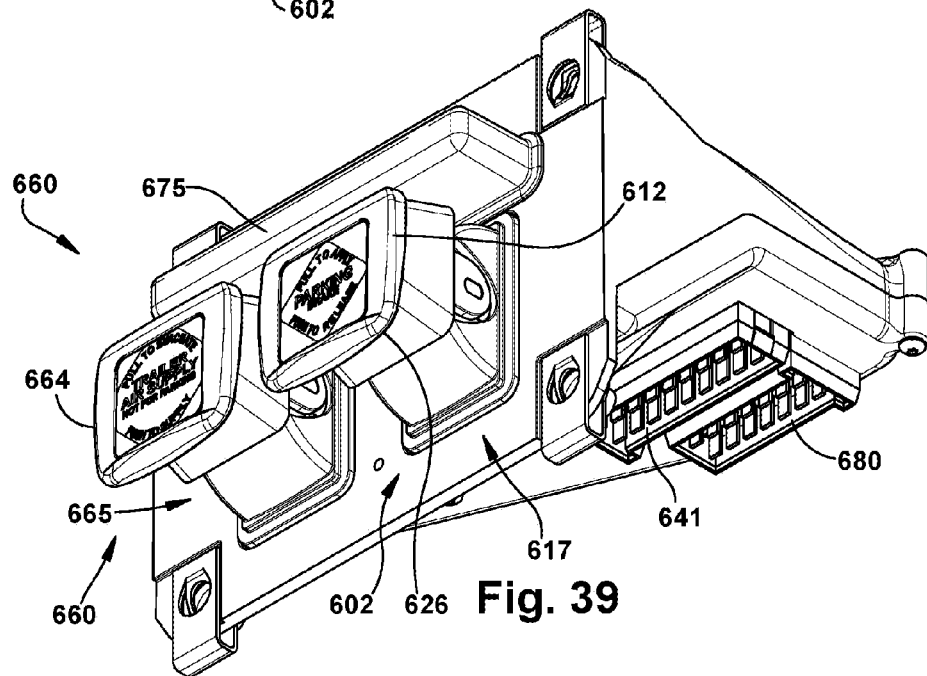

ELECTRONIC PARK BRAKE INTERFACE MODULE, PARK BRAKE CONTROLLER AND SYSTEM

CROSS-REFERENCE TO RELATED APPLICATIONS

This application claims priority to and the benefit of U.S. application Ser. No. 15/713,614, filed Sep. 23, 2017, which is a continuation-in-part claiming priority to and the benefit of U.S. application Ser. No. 15/275,396, filed Sep. 24, 2016, entitled, "Electronic Park Brake Control Interface Module, Park Brake Controller and System." The entire contents of U.S. application Ser. No. 15/713,614 and U.S. application Ser. No. 15/275,396 are incorporated herein by reference.

BACKGROUND

The present invention relates to a park brake interface module for operating the park brake of a vehicle, a park brake controller park brake controller, and a vehicle system. More specifically, the present invention relates to an electronic park brake interface module, a park brake controller park brake controller, and a vehicle system.

Electronic park brake controls in commercial vehicles are replacing the conventional mechanical systems at the user interface, often referred to as the human-machine interface (HMI). Electronic park brake switch assemblies are replacing air brake parking systems that require an air valve and pneumatic tubing in the dashboard of the vehicle to actuate the park brake. For example, the MV-3® dash control module from Bendix Commercial Vehicle Systems LLC includes a mechanical push-pull control to operate the vehicle park brake. Electronic park brake controls that have replaced the mechanical-pneumatic controls have a similar HMI appearance to the conventional mechanical controls, but they operate much differently. For example, a mechanical-pneumatic control is a two-position latching control. When the control is pulled the air pressure causes the button to forcibly pop-out and hit the operator's hand to provide confirmation that the status of the vehicle park system is changed. The electronic park brake controls that have since replaced the mechanical-pneumatic controls are momentary controls that do not come with forcible movement and auditory feedback associated with the mechanical-pneumatic operation. The replacement of conventional controls with the electronic controls frequently causes operator confusion where an operator sees a similar-looking electronic version of mechanical-pneumatic brake control but does not experience the anticipated response of the mechanical-pneumatic control.

SUMMARY

Various examples of a park brake interface module, a park brake controller, and a vehicle system are disclosed. In accordance with one aspect, a park brake interface module includes a park brake switch device capable of engaging the vehicle park brake in a brake apply mode upon receipt of a pinch signal.

In another aspect of the present invention, the park brake interface module includes a park brake switch device capable of engaging the vehicle park brake in a brake release mode upon receipt of a reach signal.

In accordance with another aspect, a park brake interface module includes a park brake switch device having an actuation member and a target member. The actuation member of the park brake switch device is movable in a direction toward the target member to engage the park brake in a "brake apply" position and is movable in a direction away from the target member to disengage the park brake in a "brake release" position.

In another example, a vehicle park brake interface module includes a first park brake switch device and a second park brake switch device. The first park brake switch device has an actuation member that is movable in a direction toward and away from the second park brake switch device, the first park brake switch device being in a park brake apply mode when the actuation member of the first park brake switch device is proximate the second park brake switch device.

In another aspect, a vehicle park brake interface module includes a means for receiving a pinch gesture by an operator of the vehicle to electronically activate the park brake.

In another aspect, a vehicle park brake interface module includes a first park brake switch device and a second park brake switch device. The first and second park brake switch devices include non-moving elements which sense gestures by the operator of the vehicle. The non-moving elements may also provide haptic feedback to the operator of the vehicle, preferably haptic feedback similar to the feedback produced by pneumatic park brake switches.

In another aspect, a vehicle system includes a park brake, a park brake switch device and a target member. The park brake switch device includes an actuation member that is movable in a direction toward and away from the target member. The park brake of a vehicle power unit is in a park brake apply mode when the position of an actuation member of the park brake switch device is proximate the target member, and the park brake switch device is in a park brake release mode when the actuation member is remote from the second park brake switch device.

In another aspect, a park brake controller includes a processing unit and logic. The processing unit is capable of receiving a pinch signal indicative of a parking brake request, and transmitting a park brake control message in response to the pinch signal indicative of a parking brake request being received.

In yet another example, a method for applying a vehicle park brake of a vehicle includes moving an actuation member of a park brake switch device toward a target member of the park brake interface module and generating a pinch signal to apply the vehicle park brake. The vehicle park brake is in the brake apply mode when the actuation member is proximate the target member.

In yet another example, a park brake interface module for a vehicle includes an actuation member mounted to an electromechanical switch to activate the park brake. The actuation member includes a finger pad opposite the front surface and the actuation member is movable between a brake apply position and a brake release position to actuate the vehicle park brake.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention. The components in the drawings are not necessarily to scale. Also, in the drawings, like reference numerals designate corresponding parts throughout the several views.

FIGS. 2 through 4 are perspective view illustration of a park brake interface module having an actuator switch device shown in a neutral state, a brake applied state, and a brake release state, respectively, according to another example embodiment of the present invention;

FIGS. 5 through 7 are perspective view illustrations of a park brake interface module having two activator switch devices shown in a neutral state, a brake applied state, and a brake release state, respectively, according to another example embodiment of the present invention;

FIGS. 9 and 10 are schematic illustrations a vehicle dashboard and park brake interface modules mounted in example alternative arrangements, according to examples of the present invention;

FIGS. 11 and 12 are schematic illustrations of a vehicle dashboard and park brake interface modules that include a protective guard, according to example embodiments of the present invention;

FIGS. 19 through 22 are schematic illustrations of a park brake interface module that includes a gesture switch device having a camera, according to example embodiments of the present invention;

FIGS. 38 and 39 are top and bottom perspective view illustrations of the park brake interface module of FIGS. 34-39, according to examples of the present invention;

DETAILED DESCRIPTION

Example embodiments of the present invention are directed to a brake switch module, such as that used in a heavy vehicle such as a truck, a bus or other commercial vehicles. Although the examples explained herein relate to a park brake interface module on trucks or other commercial vehicles with pneumatic brakes, it is understood that the park brake interface module can be used in alternative applications. In addition, although the examples explained herein often describe fluid within the brake system as being air, it is understood that the various examples of a park brake interface module can be used in alternative applications with alternative mechanisms for actuating the park brake.

Figure 1:
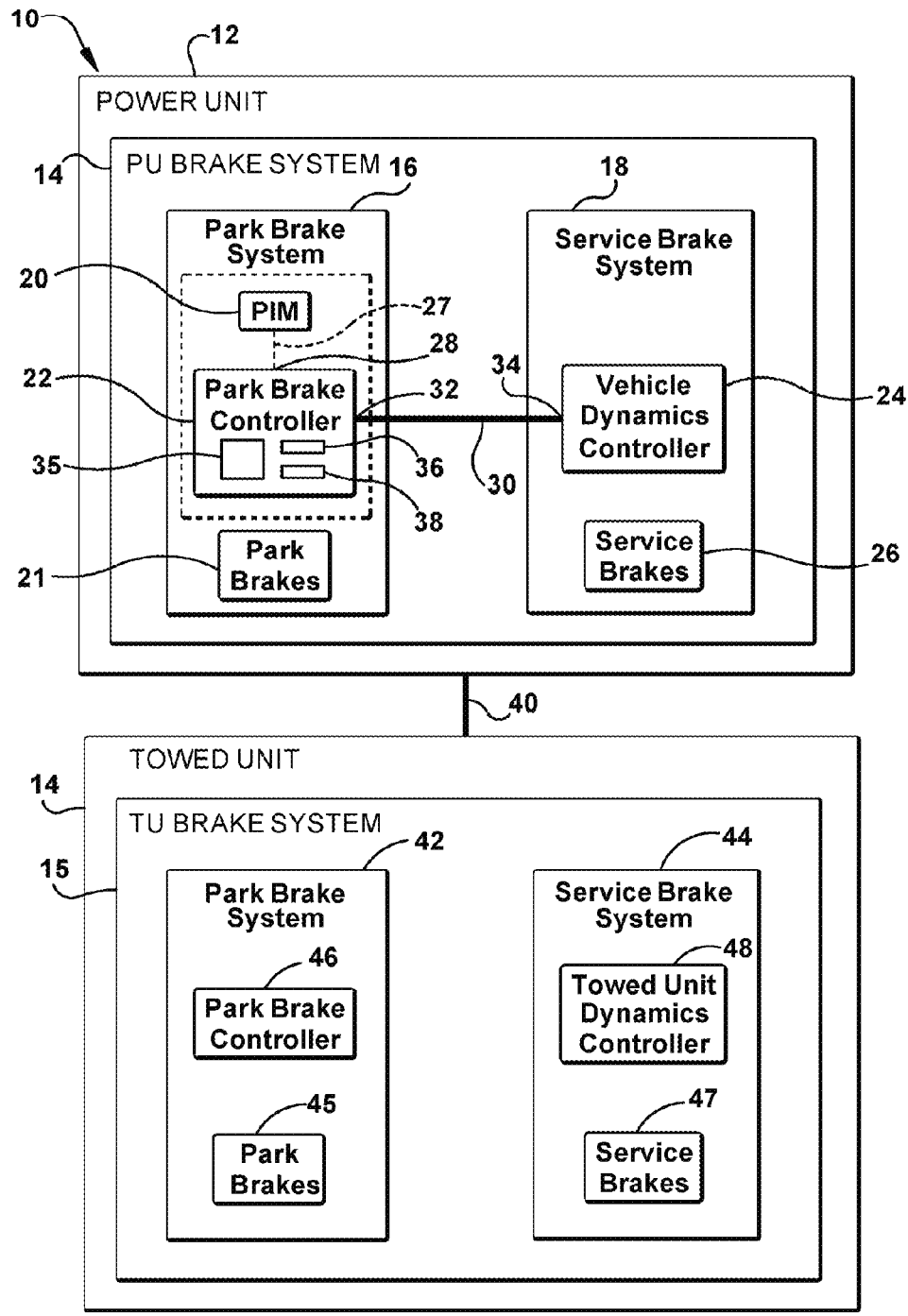
FIG. 1 is a schematic representation of a vehicle system which includes a park brake interface module, according to an example embodiment of the present invention.

Various examples of an electronic park brake interface module, park brake controller, a vehicle system and methods for controlling the park brake are disclosed. FIG. 1 illustrates a schematic representation of a vehicle system 10 that includes a power unit 12 having a power unit brake system 13, and optionally, a towed vehicle 14 having a towed unit brake system 15. Power unit 12 represents a vehicle which can include, but is not limited to, a tractor, a commercial vehicle, a bus, for example.

Brake system 13 of power unit 12 includes a park brake system 16 and a service brake system 18. Park brake system 16 includes a park brake interface module 20, park brakes 21, and a park brake controller 22. Service brake system 18 includes vehicle dynamics controller 24 and service brakes 26. Vehicle dynamics controller 24 controls the various vehicle dynamics associated with the different types of vehicle brakes, for example, anti-lock braking system (ABS), electronic stability program (ESP), automatic traction control (ATC), etc. Vehicle dynamics controller 24 includes a processor and logic (not shown) to monitor a variety of functions of the vehicle 10. These functions can include, but are not limited to, the vehicle ignition state, the vehicle motion state, the vehicle service brake pedal state, and the driver occupancy state, the status of the park brake, for example.

In accordance with an example of the present invention, park brake controller 22 is a component of park brake interface module 20 (shown as a unit in dashed lines) as part of the park brake system 16, and in another example, park brake controller 22 is integrated with vehicle dynamics controller 24 of the service brake system 18, with or separate from park brake interface module 20. In yet an alternative example, park brake controller 22 is an independent component of power unit 12 separate from the park brake interface module 20 and the vehicle dynamics controller 24. A variety of combinations of the various controllers is possible.

Park brake interface module 20 can be mounted on the dashboard of a vehicle and is operable by an operator, such as a driver of the vehicle. Park brake interface module 20 communicates with park brake controller 22, for example, via communication path 27 at electronic control port 28. In another example, park brake controller 22 also communicates with vehicle dynamics controller 24, for example, via communication path 30 at electronic control port 32 of park brake controller 22 and electronic port 34 of vehicle dynamics controller 24. Park brake controller 22 includes a processor 35, memory 36 and logic 38 to operate the functions of the park brake interface module 20.

As mentioned above, in another example, vehicle system 10 includes at least one vehicle towed unit 14 which communicates with power unit 12 via communication path 40. Towed unit brake system 15 includes park brake system 42 and service brake system 44. The park brake system 42 includes park brakes 45, and optionally, a park brake controller 46, and service brake system 44 includes service brakes 47 and towed unit dynamics controller 48. Park brake interface module 20 of vehicle system 10 is used to electronically control the park brake of a vehicle, for example, an air brake vehicle. Park brake controller 22 initiates requests for actuation of park brake, i.e. park brake "apply" or park brake "release", in response to inputs from an external source, for example, the vehicle operator via park brake interface module 20. In one example, park brake controller 22 of park brake system 16 is equipped to enable the actuation of the park brakes of the power unit, and optionally, the park brakes of the towed unit. For example, park brake system 42 of towed unit 14 can be controlled by park brake controller 22 of the power unit brake system, and is capable of directly applying and releasing the vehicle park brakes on both the power unit 12 and the towed unit 14. In another example, park brake system 15 of towed vehicle 14 operates independently of brake system 13 of power unit 12, and park brakes 45 of towed unit 14 can be controlled by park brake controller 46, or another controller on the vehicle. In another example, vehicle dynamics controller 24 of power unit 12 is equipped to enable the actuation of the park brakes 21 of power unit 12 and/or park brakes 45 of towed unit 14 of the vehicle while also managing additional functions, for example, antilock braking system and/or electronic stability control functions.

The park brake controller 22 includes a processing unit 35, which can include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The park brake controller 22 also includes memory 36 and control logic and is in electrical communication with port 28 and port 32. One function of the control logic 38 is to receive and process information regarding requests to apply or release the park brake(s) of the vehicle, via an electronic signal at port 28 indicating the vehicle operator's intent to park or un-park the vehicle. Another function of the control logic 38 is to receive, transmit and process information relating to feedback messages, such as check messages and confirmation messages, for example, visual, sound, and vibration signals to the operator or driver.

As noted above, for example, park brake interface module 20 and park brake controller 22 are electrically connected via communication path 27. Park brake controller 22 and vehicle dynamics controller 24 are electrically connected via communication path 30, or in another example mentioned above, they can be integral as one controller unit that may or may not support other vehicle control functions. Communication path 27 and path 30 enable bidirectional communication between the park brake interface module 20, park brake controller 22, and vehicle dynamics controller 24 of service brake system 18, as well as with other controllers electrically connected to the communication path 27 and communication path 30. In one example arrangement, communication path 27 and/or 30 is a hard-wired communication path, for example a serial communication bus. The serial communication bus may be arranged to carry out communications according to an industry standard protocol, including but not limited to SAE J1939 or SAE J1922, or a proprietary bus protocol. A proprietary bus protocol uses messages that are proprietary to the manufacturer of the controllers that are connected to the serial communication bus. Controllers made by a different manufacturer may be able to receive the proprietary messages but would not be able to interpret a proprietary message. A discrete hard-wired logic line could alternatively be used as the communication path 27 or communication path 30.

In another example, communication path 27 and communication path 30 are wireless paths. The wireless path may be arranged to carry out communications according to an industry standard protocol, including but not limited to RKE, Zigbee, Bluetooth or IEEE 802.11. Robust transmission between the dash switch controller and the brake system controller of the operator's intent to actuate or release the park brake is desired in order to prevent inadvertent actuation or release of the park brake.

In any of the example embodiments described above, park brake interface device 20, park brake controller 22, and vehicle dynamics controller 24 can communicate directly with each other or via a serial communication bus.

FIG. 2, FIG. 3 and FIG. 4 are perspective view illustrations of an example park brake interface module 20 which includes a park brake switch device 50 which is an actuator switch device. Park brake interface module 20 includes front panel 51, housing 52, and base 54 which can be separate components or each of which may be combined in various integrated arrangements. Park brake switch device 50 can be, for example, a three-position, toggle switch and has actuation member 60, for example a toggle paddle. Park brake switch device of FIG. 2 shows actuation member 60 in the neutral position along centerline, $C_L$, between target member 61, for example a pylon, and an optional end pylon 62.

In operation, park brake switch device 50 can be actuated by the operator to apply or release the park brake according to memorable phrases or mnemonics, "pinch to park" and "reach to release". The "pinch" motion herein corresponds to a converging motion, or more simply, a motion that results in the actuation member 60 being moved closer to target member 61. For example, an operator pinches actuation member 60, e.g. toggle paddle, to apply the park brake 21 (FIG. 1) by moving pylon toward target member 61, for example a pylon, and to generate a "pinch" signal to achieve a "park brake apply" mode of the power unit park brakes 21.

FIG. 3 shows front view of park brake interface module 20 with park brake switch device 50 in the "pinch to park" state. Actuation member 60, or toggle paddle, is moved toward the target member 61 and distal end of actuation member 60, is proximate to target member 61. Actuation member 60 is in a park brake apply mode or proximate to target member 61 when actuation member 60 is closer to target member 61 than end pylon 62. In another example, the actuation member 60 can be considered proximate target member 61 when the distance, $d_1$, between actuation member 60 and target member 61 is less than the distance, $d_2$, between the target member 61 and the neutral position along centerline, $C_L$. In another example, actuation member 60 is a distance, $d_1$, of about 0.25 inch or less from target member 61.

FIG. 4 shows actuation member 60 is moved away from target member 61, for example a pylon, in a diverging motion relative to pylon 61 to achieve a "brake release" state. If park brake interface module 20 includes an optional end pylon 62, actuation member 60 approaches or contacts center pylon 61 or end pylon 62. FIG. 4 shows the park brake switch device 50 in the "brake release" state. Park brake switch device 50 can be actuated by the operator to release the park brake in a "reach" motion that results in the actuation member 60 being moved away or remote from target member 61, for example, a motion that includes but is not limited to a divergent motion of the actuation member 60 relative to the target member 61. Actuation member 60 can be considered to be in a park brake release mode or remote from target member 61 when actuation member 60 is further from target member 61 than it is from end pylon 62, if present, or further from target member 61 than it is from the neutral position indicated by centerline, $C_L$. That is, actuation member 60 can be considered remote from target member 61 when the distance, $d_3$, between actuation member 60 and target member 61 is greater than the distance, $d_4$, between the target member 61 and the neutral position along centerline, $C_L$. In another example, actuation member 60 is a distance, $d_3$, of about 0.5 inch or greater from target member 61.

Park brake switch device 50 can be one of several types of actuator switches which function to allow movement of the actuator switch or a component of the switch toward target member 61. Examples of suitable switches include, but are not limited to, a toggle switch described above, and a slide switch that can move toward or away from a target member 61 or target pylon to transmit a pinch or reach signal, respectively. The park brake switch device 18 can include an electro-mechanical switch that changes the state of the park brake by opening and closing the electrical contacts, or a fixed switch device having contact-sensitive elements, such as piezoelectric sensors, preferably having the ability to provide haptic feedback to the operator in response to switch actuation. In another example, the park brake switch device can be a contactless switch that can detect the position of an object, such as an actuator member.

Examples of contactless switches include, but are not limited to, an actuator switch that includes an optoelectronic encoder which employs digital logic technology to sense the position of actuation member 60, and a an actuator switch that includes "Hall's effect" technology in which voltage varies based on magnetic field. Park brake switch device 50, as an example in accordance with the present invention, includes a quadrature rotary optical encoder which has two detectors to provide outputs per switch and a code rotor that either blocks infrared light or allows it to pass to the detectors. As the shaft turns the rotor the outputs change state to indicate position of the park brake switch device 50. The presence of one channel per switch is sufficient for park brake switch device herein, although the presence of two channels per switch provides for independent readings and overall signal integrity. An example of a suitable optoelectronic encoder is series 68O available from Grayhill, Inc. of LaGrange, Ill. Another example of a contactless switch is an electromagnetic switch based on "Hall's effect" technology. An example of a suitable switch is a series 68B Hall effect encoder available from Grayhill, Inc.

Still referring to any of FIG. 2, FIG. 3, and FIG. 4, park brake interface module 20 can optionally include feedback device 63 which provides a feedback signal which can indicate the status of the park brakes of power unit 12. For example, feedback device 63 can be an indicator light that is lit up or in the "on" or applied mode when the park brakes are on and does not provide light when the park brakes are in the "off" or release mode. Feedback device 63 can also provide a feedback signal in response to a change in state of the park brake switch device, the park brakes, or both. For example feedback device 63 can indicate whether the park brake of power unit 12 has been actuated by the driver. In another example, park brake interface module can optionally include a second feedback device 64 that can indicate something different than feedback device 63. For example, feedback device 63 can indicate status of the park brakes and feedback 64 can indicated whether or not an operator requested a change of status of the park brake. For example, feedback device 64 can be a light that blinks during the lag time between the operator's request for change and the actual change in status of the park brakes. Feedback device 64 can also indicate warning messages regarding any systems in the vehicle. The feedback messages described above are visual, however, check messages, confirmation messages, and warning messages can also be sound and/or vibration signals to the operator.

FIG. 5, FIG. 6, and FIG. 7 are perspective views of a park brake interface module 65 having a second park brake switch device 70, in accordance with another example embodiment of the present invention. For example, the second park brake switch device 70 can be associated with the control of park brakes of towed vehicle 14 (FIG. 1). FIG. 5 shows park brake interface module 65 in a neutral position and actuation members 60 and 72 extend substantially parallel to one another and parallel to end pylons 62 and 66 which are optional components. FIG. 6 shows the first and second park brake switch devices 50 and 70 in the "pinch to park" position to achieve a park brake "apply" mode of the power unit park brakes 21 (FIG. 1) and the towed unit park brakes 45 (FIG. 1). Actuation members 60, 72 of park brake switch devices 50, 70, respectively, are shown in the "pinch" position which results from the convergent motion of the two park brake switch devices 50, 70. The pinch and release motions can be achieved without the presence of center pylon 61 located between the two switches 50, 70 or between the two actuation members 60, 72. Actuation members 60, 72, can be squeezed together to generate a pinch signal to achieve park brake apply mode. In addition, each of the actuation members 60, 72 can operate the park brakes separately. For example, actuation member 60 can be moved toward actuation member 72 to generate a "pinch" signal to achieve a park brake apply mode of the power unit park brakes 21, and alternatively, actuation member 72 can be moved toward actuation member 60 to generate a "pinch" signal to achieve a park brake apply mode of the towed unit park brakes 45.

FIG. 7 is a perspective view of the park brake interface module 65 in the brake release state, or "reach to release" state. Park brake switch device 50 and 70 can operate independently of the other. For example, park brake switch devices 50 and 70 may be placed in the pinch to park mode together or separately. If the park brake for towed vehicle is applied, the park brake for power unit can be in either the apply brake or release brake mode. In such situation, actuation members do not both cooperate to transmit a pinch signal, however and park brake interface module 65 includes target member 61 and the pinch signal is achieved by moving actuation member 60 toward target member 61 to activate change for park brake of power unit 12 (FIG. 1).

In any of the park brake interface modules 20, 65 described above, for example, the park brake switch device 50, 70, are illustrated as three-way switches having a neutral position. Once the force that is applied to an actuation member 60, 72 is removed, the actuation member 60, 72 will return, or spring back, to neutral position. In alternative embodiments, one or more of the park brake switch devices 50, 70 is a monostable, two-position switch that is also actuated by "pinch" and "reach" motions to apply and release the park brakes, respectively. Once the force applied to actuation member 60, 72 of switch devices 50, 70, is removed actuation member 60, 72 will remain in the same position. Another phrase that is memorable to the operator and associated with a two-way switch is the mnemonic "pinch-and-stay".

Figure 8:
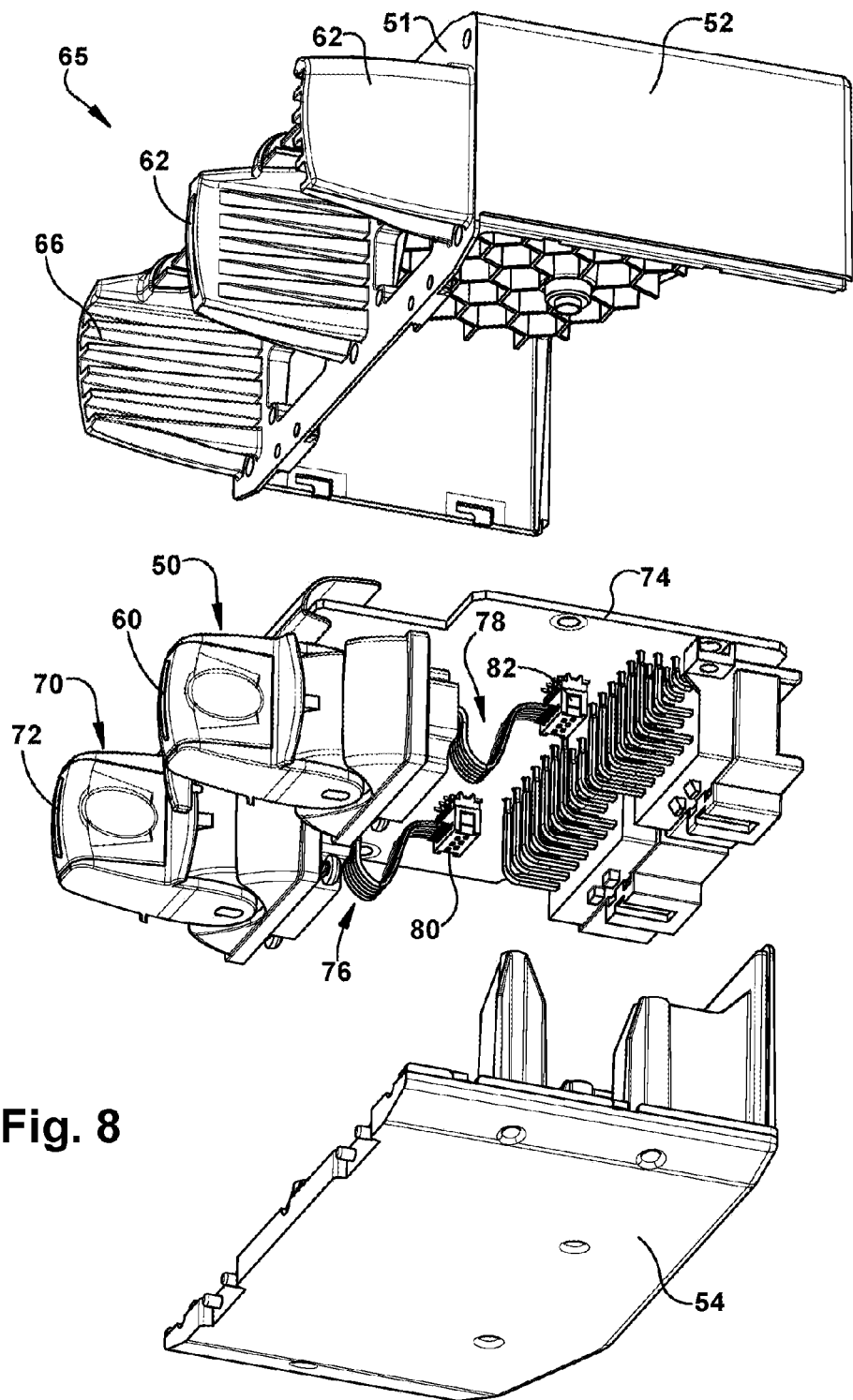
FIG. 8 is an exploded perspective view of the park brake interface module of FIGS. 5 through 7 illustrating the internal components, according the an example embodiment of the present invention.

FIG. 8 is an exploded perspective view of the park brake interface module 65 shown in FIG. 5-7 rotated in a clockwise direction and in a horizontal position. The exploded view illustrates various internal components inside housing 52 and base 54. Park brake switch device 50 and park brake switch device 70, in accordance with an example of the present invention, are actuator-type switch devices that include optoelectronic encoders 76 and 78. These devices are physically mounted on printed circuit board (PCB) 74 and connected to pin connectors 80 and 82 at one end and secured to actuation member 60 and 72 at the other end, respectively. Printed circuit board 74 can provide the logic 35 (FIG. 1) associated with park brake controller 20 (FIG. 1) as an interface between park brake input module and park brakes 21 of power unit 12, and optionally, park brakes 45 of towed unit 14.

FIG. 9 and FIG. 10 are schematic illustrations of a cab compartment 90 of a heavy truck vehicle 10 (FIG. 1), showing a park brake interface module 65 mounted in different positions as determined according to example OEM dashboard designs. Park brake interface module 65 includes the two brake switch devices 50 and 70, mounted in alternative arrangements as determined by OEM dashboard design. For example, park brake interface module 65 can be oriented so that actuator switches 50, 70 are arranged vertically as shown in FIG. 9 and actuation members are moved up and down relative to the dashboard 94. Interface module 65 can also be oriented so that actuator switches 50, 70 are arranged horizontally as shown in FIG. 10 and actuation members are moved side to side relative to the dashboard 94 Regardless of the mounting orientation of the module or position of the switches with respect to the driver, the motions "pinching to park" and the "reaching to release" still apply, providing a clear and memorable mnemonic alleviating driver confusion in the operation of an electronic switch for applying a vehicle park brake, for example, an a pneumatic park brake.

FIG. 11 and FIG. 12 are schematic representations of park brake interface module 100 mounted in dashboard 94, representing another example embodiment of the present invention. Park brake interface module 100 includes park brake switch device 102 for controlling the park brake of power unit 12 (FIG. 1) and park brake switch device 104 for controlling the park brake of towed vehicle 14 (FIG. 1). Optional feedback devices 106, 108 and 110 can provide lighting, for example, as an indicator of a change in the park brake mode. Park brake switch devices 102 and 104 have actuation members 103 and 105, respectively, which are movable in parallel directions rather than converging and diverging directions relative to one another. Park brake switch module 100 includes target member 115 that is located proximate the actuation members 103, 105, and can function both as a target member to facilitate the pinch and release signals and as a guard to prevent inadvertent activation of park brake switch devices 102 and 104 by the operator of the vehicle.

Referring to FIG. 11, actuation member 103 can be moved in the direction of arrow 118 to converge toward target member 115 to produce a pinch signal to activate the park brake, and moved in the direction of arrow 120 to diverge away from target member 115 to produce a reach signal to release the park brake of power unit 12 (FIG. 1). Likewise, actuation member 105 can be moved in the direction of arrow 120 to converge toward target member 115 and moved in the direction of arrow 122 to diverge away from target member 115 of towed vehicle 14 (FIG. 1) if present. FIG. 11 shows park brake switch target member 115 of module 100 is positioned vertically along dashboard 94 between driving wheel 92 and park brake switch devices 102 and 104. This location of target member 115 between wheel 92 and park brake switches can help protect against an operator's inadvertent actuation of actuation members 103 and 105.

Target member 115 of park brake switch module 100 of FIG. 12 is located in a horizontal orientation along dashboard 94 above park brake switch devices 102 and 104. Actuation member 105 can be moved in the direction of arrow 126 to converge toward target member 115 to produce a pinch signal to activate the park brake, and moved in the direction of arrow 128 to diverge away from target member 115 to produce a reach signal to release the park brake of power unit 12 (FIG. 1). Likewise, actuation member 103 can be moved in the direction of arrow 130 to converge toward target member 115 and moved in the direction of arrow 132 to diverge away from target member 115 of towed vehicle 14 (FIG. 1) if present. The horizontal arrangement of the park brake switch devices 102 and 104 as shown in FIG. 12 can be beneficial for protecting against unintended actuation from falling objects with target member 115 as shown in FIG. 12.

Figure 14:
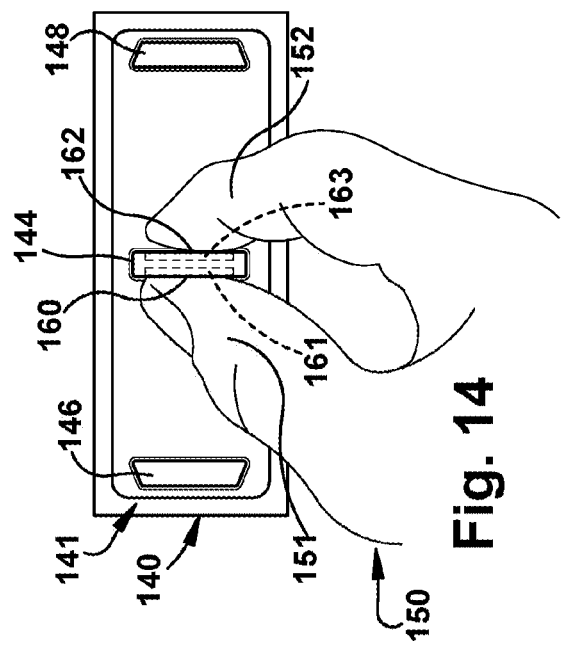
FIGS. 13 and 14 are schematic illustrations of a park brake interface module that includes a sensor switch device, according to example embodiments of the present invention.
Figure 13:
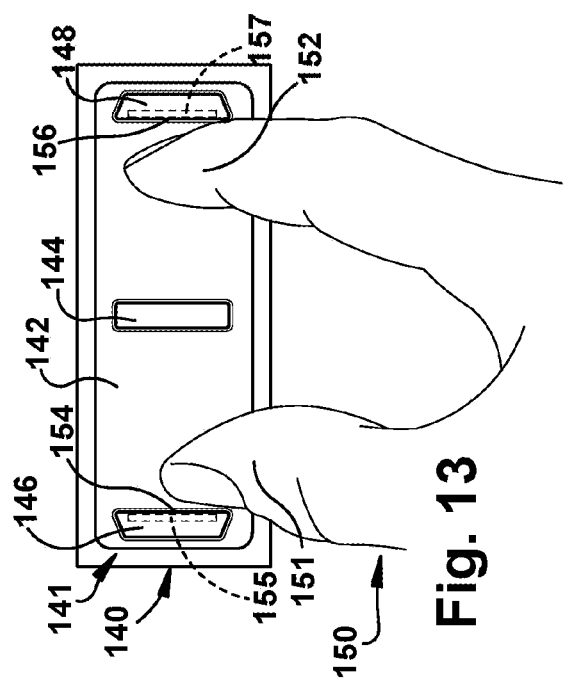

FIG. 13 and FIG. 14 show the front view of a park brake interface module 140 having a park brake switch device 141 in two different modes of operation. Park brake switch device 141 is a sensor switch device and detects the contact or near contact, i.e. proximity, of an operator or an instrument (not shown), in generating pinch signals for applying the park brake and reach signals for the release of the park brake of power unit 12 (FIG. 1) or towed vehicle 14 (FIG. 1). A sensor switch device 141 for example a contact switch and a proximity switch, can be based on one or more of a variety of sensor technologies that detect contact, or near contact or close proximity, with the sensor switch device 141 to generate a pinch signal. For example, sensor technologies can be based on capacitive, inductive, or resistive sensor technology, and examples include, but are not limited to, infrared, surface acoustic wave, optical imaging, and acoustic pulse recognition.

Referring to FIG. 13 and FIG. 14, park brake switch device 141 includes front panel or surface 142 and target member 144 disposed on the surface. Target member 144 can be a pylon or a pressure pad and is shown located between end pylons 146 and 148 which are optional. FIG. 14 shows an operator's hand 150 is positioned such that thumb 151 and finger 152 are located on either side of target member 144. Operator's thumb 151 and finger 152 are shown in contact or close proximity to target member 144 which is the "pinch to park" position to achieve a park brake "apply" mode of the power unit park brakes 21 (FIG. 1) or the towed unit park brakes 45 (FIG. 1).

In another example, where end pylons 146 and 148 are present, the operator's thumb is located between target member 144 and end pylon 146 and reaches toward, and optionally touches, end pylon 146. Finger 152 is located between target member 144 and end pylon 148 to reach toward, and optionally touch, end pylon 148. The operator's hand is shown contacting pylon surfaces, for example inside surfaces 154 and 156 of pylons 146 and 148, respectively, which is the "reach to release" position to generate a park brake release signal to release or un-park the park brakes of the power unit park brakes 21 (FIG. 1) or the towed unit park brakes 45 (FIG. 1).

Surfaces 154 and 156 are sensitive to touch, or near touch, and can include, for example, one or more sensors 155 and 157 which are shown located, for example, inside pylons 146 and 148, respectively. The touch-sensitive surfaces 154, 156 can be a rigid surface or a pressure pad, and can be based on one or more of a variety of sensor technologies that detect contact, or near contact, with at least a portion of pylon surface 154 and 156. For example, sensor technologies can be based on capacitive, inductive, or resistive sensor technology, and examples include, but are not limited to, infrared, surface acoustic wave, optical imaging, and acoustic pulse recognition. Pylons 146, 148 can include proximity sensors 155, 157 which detect operator inputs when an object approaches surfaces 154, 156. An example of a proximity sensor can include a photodiode sensor.

In FIG. 14, the operator's thumb 151 is in contact, or near contact, with surfaces 160 and 162, of target member, 144 and surfaces 160 and 162 of target member 144 are sensitive to touch due to the presence, for example, of sensors 161, 163, inside target member 144. In another example, surfaces 160, 162 of target member 144 can be a pressure pad (not shown) that is sensitive to touch on the outer surfaces 160, 162 of pylon 144. Thus, the deformation of sensitive surfaces 160, 162, such as a pylon or pressure pad, caused by squeezing or by convergent motion of at least one of the operator's thumb 151 and finger 152 can generate a pinch signal to activate the park brake in the park mode.

Figure 15:
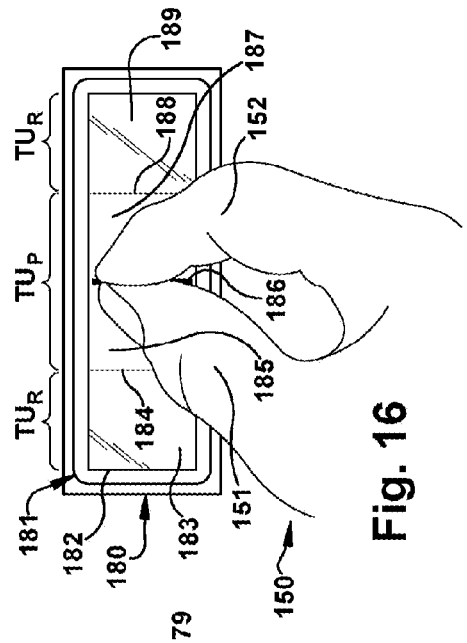
FIGS. 15 through 18 are schematic illustrations of a park brake interface module that includes a sensor switch device having a touchscreen, according to example embodiments of the present invention.
Figure 16:
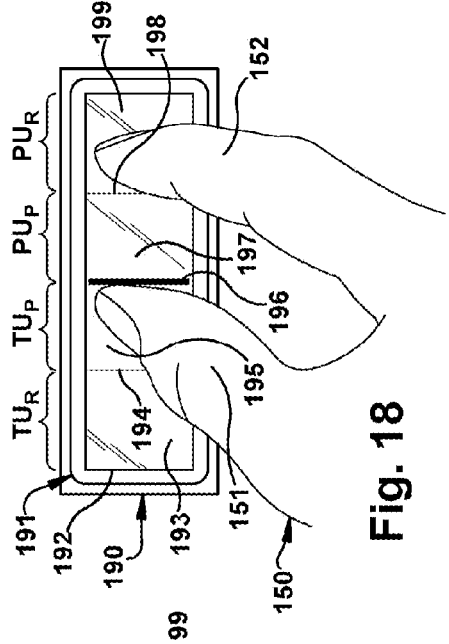

FIG. 15 and FIG. 16 are schematic illustrations showing the front view of a park brake interface modules 170, 180 having park brakes switches that are sensor switches, and more specifically, touchscreen switches. Touchscreen, for example a liquid crystal display (LCD) touchscreen, senses the contact of operator hand 150. The park brake interface modules 170, 180 can each be used to independently operate the park brakes of the power unit 12, the towed unit 14. For example, FIG. 15 illustrates a park brake interface module 170 for operating the park brakes of power unit 12 (FIG. 1) and FIG. 16 illustrates a park brake interface module 180 for operating the park brakes of towed unit 14 (FIG. 1) Referring to FIG. 15 park brake interface module 170 has a switch device 171 and a panel or a touchscreen 172. Touchscreen 172 senses the movement of the hand 150 and varying distances between the thumb and fingers, and/or the motion or touch relative to the virtual reference locators or "virtual pylons" 175, 177, and 178, for example. FIG. 15 illustrates three general regions of the switch device: the power unit "reach to release" left region indicated by $PU_R$ and zones 173 of the touchscreen, the power unit "pinch to park" central region indicated by $PU_P$ and zones 175 and 177 of the touchscreen, and the power unit "reach to release" right region $PU_R$ and zone 179 of the touchscreen. Touchscreen zones 173 and 175 are separated by physical or virtual pylon 174, zones 175 and 177 are separated by pylon 176, and touchscreen zones 177 and 179 are separated by pylon 178 for sensing the location of thumb 150 and finger 152. FIG. 15 shows the thumb and finger spread apart and in contact or near contact with zones 173 and 179 to generate a release signal, i.e. a "reach to release" signal. FIG. 16 is a separate but similar interface module 180 that is used to operate the towed unit if interface module 170 is used to operate the power unit, or vice versa. FIG. 16 illustrates three general regions of the switch device 181 indicated by $TU_R$, $TU_P$, and $TU_R$ to indicated towed unit pinch and release zones which is similar to that described for park brake interface module 170 of FIG. 15 described above. Touchscreen 182 includes the power unit "reach to release" left region indicated by $PU_R$ and zones 183 of the touchscreen, the power unit "pinch to park" central region indicated by $PU_P$ and zones 185 and 187 of the touchscreen, and the power unit "reach to release" right region $PU_R$ and zone 189 of the touchscreen. Touchscreen zones 183 and 185 are separated by physical or virtual pylon 184, zones 185 and 187 are separated by pylon 186, and touchscreen zones 187 and 189 are separated by pylon 178. FIG. 16 shows the thumb and finger pinched together to generate a pinch signal, i.e. a "pinch to park" signal, and thumb 151 and finger 152 can be in contact or near contact with each other within zones 185 and 187 and/or in contact or near contact with physical or virtual pylon 186. As shown, FIG. 15 illustrates park brake switch 171 of power unit 12 (FIG. 1) as generating a "reach to release" signal, and FIG. 16 illustrates park brake switch 181 of towed unit 14 (FIG. 1) as generating a "pinch to park" signal, however, in alternative examples, the signals can be vice versa, the signals can be both reach to release and can be both pinch to park.

Figure 17:
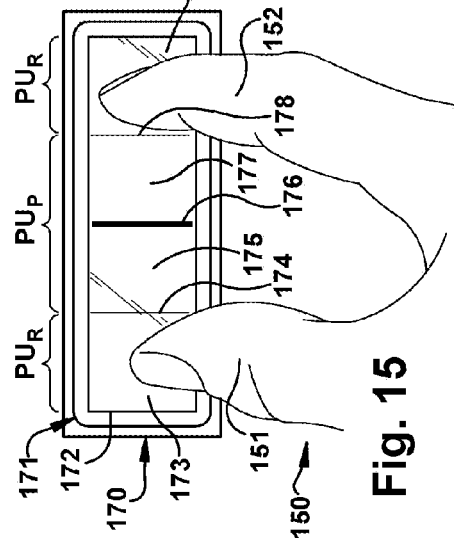
Figure 18:
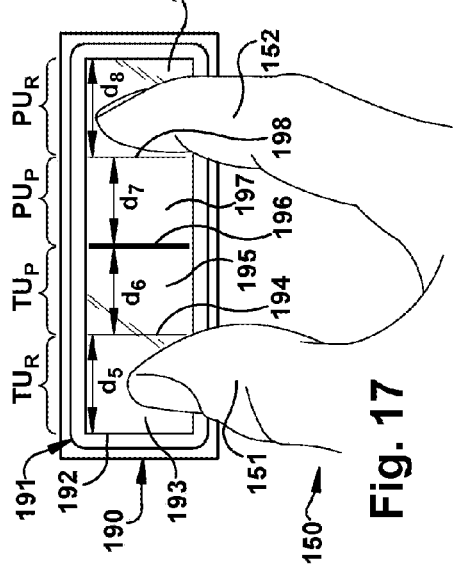

In another example, FIG. 17 and FIG. 18 show an interface module 190 and the interface module 190 includes a switch device 191 having a panel or touchscreen 192 can be used to operate the park brakes of both the power unit 12 (FIG. 1) and the towed unit 14 (FIG. 1). FIG. 17 shows four general regions $TU_R$, $TU_P$, $PU_P$, and $PU_R$ having zones 193, 195, 197 and 199 of touchscreen 192 for sensing the location of operator thumb 150 and finger 152. The distances between physical or virtual pylons 194, 196, and 198 as represented by distances $d_5$, $d_6$, $d_7$ and $d_8$ to define the available surface of each region can vary. For example, the movement of the thumb 150 in in front of regions $TU_R$ and $TU_P$, zones 193 and 195, will signal a "release" and "park" signals, respectively, for the towed unit 14. Similarly, the movement of the finger 152 in zones $PU_P$ and $PU_R$, zones 197 and 199, will signal "park" and "release" signals, respectively, for the power unit 12. Accordingly, in one example, as the operator pinches fingers together within zones $TU_P$ and $PU_P$, a signal will be generated to activate the park brakes of both the power unit 12 and the towed unit 14 in the park mode. If only one of the thumb or finger is "pinched" toward virtual pylon 196, for example, then only one of the power unit and the towed unit is activated for park. In FIG. 17, operator thumb 151 is in contact or near contact with touchscreen zone 193 or region $TU_R$, and operator finger 152 is in contact or near contact with touchscreen zone 199, or region $PU_R$, to signal "reach to release" of both the towed unit 14 and the power unit 12. In FIG. 18, operator thumb 151 is in region $TU_P$ and is in contact or near contact with virtual pylon 196 to convey a pinch to park signal to activate the park brakes of the towed unit 14, while operator finger 152 is in the $PU_R$ region or zone 199 of the touchscreen to convey a reach to release signal to release the park brake of the power unit 12.

FIGS. 19 and 20 are schematic illustrations of a front view of a park brake interface module 200 for a power unit and 220 for a towed unit. Each interface module has a park brake switch device 201 and 221, respectively, which are gesture switch devices. Park brake switch devices 201 and 221 each include cameras to receive gestures, and optionally, interpret gestures. In another example, 2D and 3D computer algorithms can interpret gestures. Referring to FIG. 19 front panel or window 202 includes a camera lens 207 which detects the presence of an object or operator. FIG. 19 illustrates three general regions of the switch device as described above with respect to FIG. 15. The regions indicated by $PU_R$ and touchscreen zones 203 and 209 are the "reach to release" zones, and the central region indicated by $PU_P$ is the "pinch to park" zone. Touchscreen zones are separated by physical or virtual pylons 204 and 208 for sensing the location of the operator hand 150. For example, if virtual pylons are employed, pylons 204 and 208 can be located a predetermined distance apart, $d_9$, and can be altered to a distance that is closer or further apart, for example, as shown by the dotted lines that are spaced a closer distance $d_{10}$ apart, to adjust the relative size of the regions, $PU_P$ and $PU_R$. As shown in FIG. 19, operator thumb and finger are spread apart a distance, $d_{11}$, which is greater than the distance between pylons 204 and 208. The operator thumb and finger are in contact, or in proximity, of the touchscreen zones 203 and 209 and the diverging motion of the fingers read by the camera in those zones generates a release signal, i.e. a "reach to release" signal of power unit 12. In another example, camera 207 does not detect operator presence outside pylons 204 and 208, i.e. in zones 203 and 209, and the switch 201 includes optional pylons 210 and 212 which sense touch or proximity of operator along inside surfaces 214 and 216, respectfully, to generate a park brake release signal to un-park the park brakes. In FIG. 20 the thumb and finger are pinched together in front of camera 207 to generate a pinch signal, i.e. a "pinch to park" signal by the park brake switch 221 of the towed vehicle 14. Thumb 151 and finger 152 can be in contact or near contact with each other within region $TU_P$, zones 225 and 226, and/or they can be in contact or near contact with a physical or virtual pylon if present. FIG. 21 and FIG. 22 illustrates two views of the same interface module 240 having a park brake switch 241 that can be used to operate the park brakes for both the power unit 12 (FIG. 1) and the towed unit 14 (FIG. 1). The gesture switch 241 shown in FIG. 21 and FIG. 22 includes camera 207 and window 242 divided into four general regions $TU_R$, $TU_P$, $PU_P$, and $PU_R$ having zones 243, 245, 247 and 249 of for interpreting the hand gestures of operator as described above. In FIG. 21 the operator's thumb and finger are in the "reach to release" position and the reach signal is generated to activate the park brakes in the release or un-park position. The gesture switch 241 is activated by the gesture position of the hand/fingers, or in another example, by operator contact with optional pylons 250 and 252 along surfaces 254 and 256, respectively. Pylons 250 and 252 can include sensors or pressure pads, 260, 262 (shown in phantom). In FIG. 22 the operator's thumb 150 is contact, or near contact, with finger 152 to generate a pinch signal to activate parking brake of both power unit 12 (FIG. 1) and towed vehicle 14 (FIG. 1). Accordingly, in one example, as the operator pinches fingers together within zones $TU_P$ and $PU_P$, a signal will be generated to activate the park brakes of both the power unit 12 and the towed unit 14 in the park mode. If only one of the thumb or finger is "pinched" toward virtual pylon 246, for example, then only one of the power unit and the towed unit is activated for park.

Vehicle 10 can include two interface modules described above, in any combination and arranged, for example, horizontally or vertically (FIG. 10), where one interface module controls the power unit and a second interface module controls the towed unit. In such case, a pinch motion of the fingers inside physical or virtual pylons will signal actuation of the park brakes and a release motion in which the fingers are outside physical or virtual pylons will signal a release of the park brakes.

Figure 23:
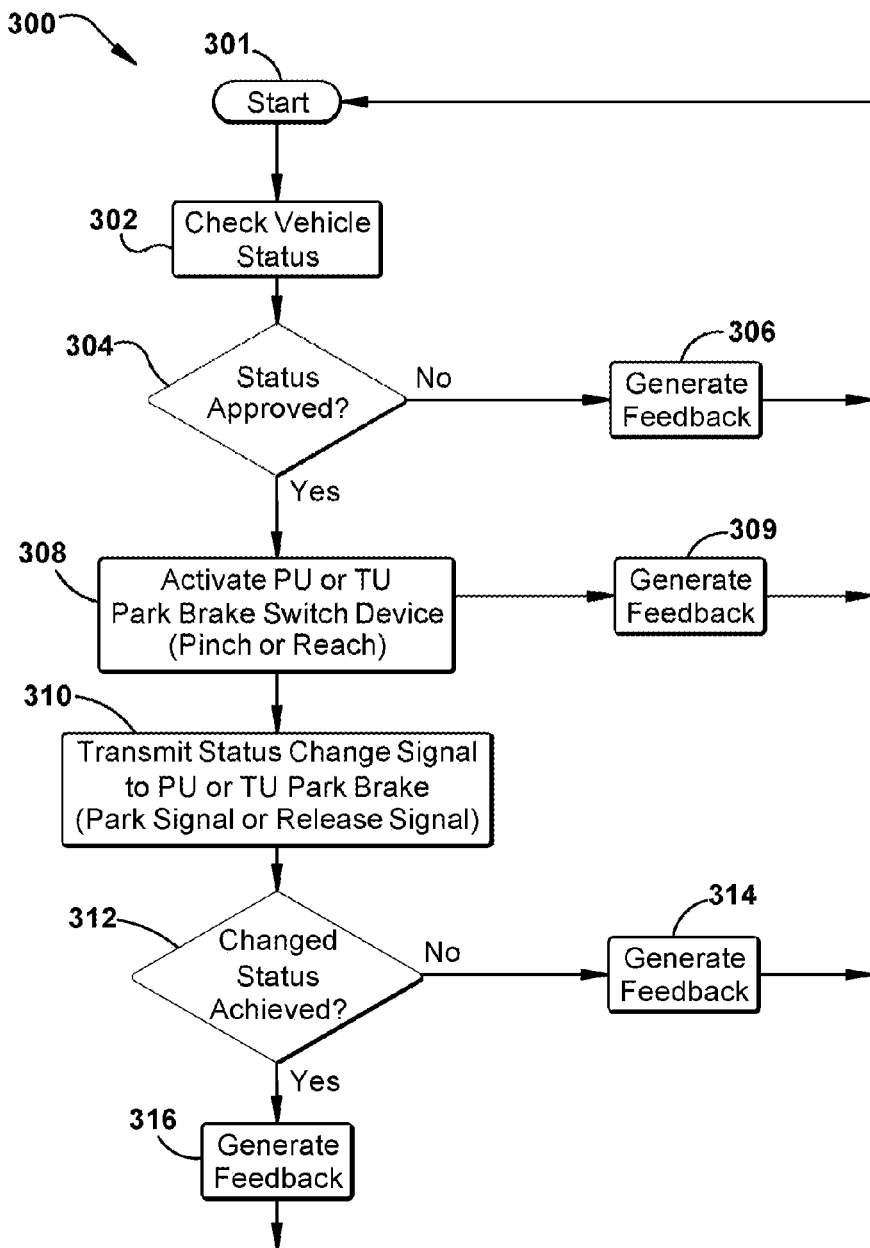
FIG. 23 is a schematic block diagram depicting a method of operating a park brake interface module of a vehicle, according to an example embodiment of the present invention.
Figure 24:
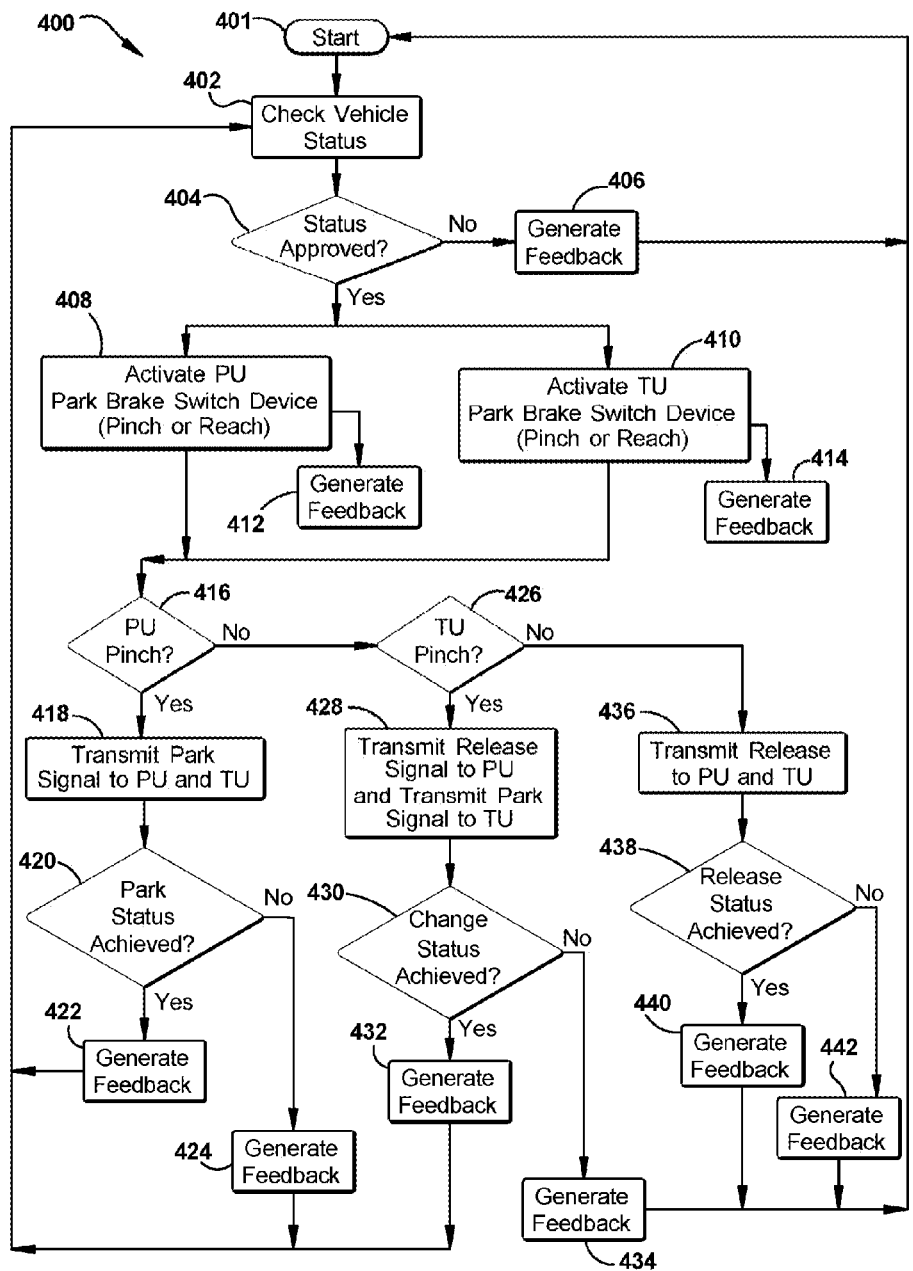
FIG. 24 is a schematic block diagram depicting a method of operating a park brake interface module of a vehicle that includes a towed vehicle, according to an example embodiment of the present invention.

FIG. 23 and FIG. 24 are flowcharts depicting methods of electronic park brake control of a vehicle power unit 12 (FIG. 1) or control of a vehicle towed unit 14 (FIG. 1), according to an example of the present invention. Electronic park brake control of the vehicle power unit 12 and the vehicle towed unit 14 can be operated independently relative to one another from the park brake input module 20 (FIG. 1) and the park brake switch device, including any of the park brake switch devices, i.e. the variety of actuation, sensor and gesture park brake switches described above.

The blocks represent functions, actions and/or events performed. It will be appreciated that electronic and software systems involve dynamic and flexible processes such that the illustrated blocks, and described sequences can be performed in different sequences than shown. It will also be appreciated that elements embodied as software may be implemented using various programming approaches such as machine language, procedural, object-oriented or artificial intelligence techniques, and some or all of the software can be embodied as part of a device's operating system.

With reference to FIG. 23, implementation of the method 300 includes using the control logic 38 (FIG. 1) of the park brake controller 22 (FIG. 1), and optionally, the control logic of one or more additional vehicle controllers, for example, at least one of vehicle dynamics controller 24 (FIG. 1) of service brake system 18, and towed unit dynamics controller 48, for example.

The method 300 for independently controlling a park brake of a power unit or a towed unit begins at step 301. In step 302, which is optional, the park brake controller 22 checks the status of the vehicle and determines whether the status is approved at optional step 304. If status is not approved, feedback from the park brake controller and/or other controllers or devices in the vehicle is generated at box 306 and the logic repeats until status is approved. Status checks can relate to one or more of several functions of the vehicle and include, but are not limited to, vehicle safety interlocks, for example, ignition status, motion state (e.g.

vehicle speed), driver occupancy, and door status (e.g. open or closed), etc. As described above, feedback can be provided by means including, but not limited to, visual, auditory and tactile feedback, for example, a feedback device 64 (FIG. 2) of interface module 20 which can be a light that turns on when status is not approved.

If no faults are detected in the vehicle system and status is approved, the park brake controller 22 can receive a parking brake request at box 308 via port 28 (FIG. 1) when the operator activates the park brake switch device of the vehicle power unit 12 or the vehicle towed unit 14. Activation of the park brake switch can be performed by the operator activating the park brake switch device, for example, activating at least one of an actuator switch device, a sensor switch device, and a gesture switch device, of the park brake interface module. That is, the park brake switch device generates a signal and the park brake controller 22 receives a request for change in the park brake status of the vehicle power unit or the vehicle towed unit. More specifically, in an example in which an activator switch is used, a first park brake switch device 50 (FIG. 2) having an actuation member 60 is moved toward a target member, for example a pylon or a second switch, in a convergent motion to place the park brake switch device in a "pinch to park" position to create a pinch signal, i.e. a park brake apply signal. Alternatively the actuation member 60 is moved in a divergent motion to place the switch in a "reach to release" position to create a reach signal, i.e. a brake release or un-park signal. In optional step 309 the method of controlling includes generating feedback that the park brake switch has been activated. Feedback can be provided via feedback device 63 (FIG. 2) which can be an indicator light that is blinks when a requested for change of status of the park brake has been made.

It should be understood that the park brake controller 22 can receive the parking control request from another controller, such as vehicle dynamics controller 24, via the port 32 or from an off-vehicle source (not shown). In another example, the control logic 38 of park brake controller 22 can independently determine that the vehicle should be parked or released. The independent determination may be based on factors such as emergency or undesired movement of the vehicle (e.g. vehicle rolls down a hill during a service brake application). After the parking brake actuation request is received by the control logic 38, the method proceeds to step 310.

In step 310, the control logic 38 of the park brake controller 22 transmits a parking brake status change signal to the park brake of power unit 12 or the park brake of towed unit 14 in response to the parking brake actuation request. The park brake controller 22 transmits the parking brake control message via port 32 using the communication paths 30 or 40 to the park brakes 21 of power unit or park brakes 45 of towed unit. In one example, the communication paths 30 and 40 are a hard-wired serial communications bus. In another example, the communication paths 30 and 40 are the wireless path wherein the park brake controller 22 uses the antenna module (not shown) to transmit messages. The method proceeds to step 312.

In step 312 a determination is made in the control logic 38 of the park brake controller 22 whether a changed status of the park brakes was achieved. If the control logic 38 determines that the changed status of the park brake was not achieved then feedback is generated as an optional step as depicted at box 314. A feedback device, for example, feedback device 64 (FIG. 2) of park brake interface module 20, generates feedback that the change in status of the park brake has not been achieved and the logic returns to the beginning at step 301. If the control logic 38 determines that the status of the park brake has been achieved, then different feedback is generated as an optional step as depicted at box 316. For example, feedback device 64 of park brake interface module 20 can generate feedback that the status of the park break has been achieved. Several possible forms of feedback can be generated, for example, feedback device 64 can be a warning light that turns on and/or blinks when the change in status has not been achieved and which remains off or turns off when the change in status has been achieved. In another example, feedback device 63 (FIG. 2) can be a brake light on the interface module and can blink when a request for change in status has been made and can remain blinking when the light when the change in status has not been achieved. The blinking light can transition fully on or off when the change in status has been successfully achieved for "brake apply" or for "brake release," respectively.

FIG. 24 is a flowchart depicting an example method 400 for electronically controlling the park brakes of a vehicle by activating both the park brake switch of a vehicle power unit 12 (FIG. 1) and the park brake switch of the towed vehicle 14 (FIG. 1). The method 400 begins at step 401 and includes using the control logic 38 (FIG. 1) of the park brake controller 22 (FIG. 1), and optionally, the control logic of one or more additional vehicle controllers, for example, at least one of vehicle dynamics controller 24 (FIG. 1) of service brake system 18, and towed unit dynamics controller 48, for example. The control of the park brake of the power unit 12 and the towed unit 14 are independent, although actuation of the park brake switch of power unit 12 in the "pinch to park" position to signal the brake apply mode of the park brakes also overrides the park brakes of the towed unit 14 to the brake apply mode.

In step 402 which is an optional step, control logic 38 of the park brake controller 22 checks the status of the vehicle and determines whether the status is approved at 404. If status is not approved, feedback from the park brake controller and/or other controllers or devices in the vehicle is generated at box 406 and the logic repeats until status is approved. Status checks can relate to one or more of several functions of the vehicle as described above for step 304 of method 300.

If no faults are detected in the vehicle system and status is approved, the park brake controller 22 can receive a parking brake request at box 408 for the park brakes of vehicle power unit 12 and also a parking brake request at box 410 for the park brakes of the vehicle towed unit 14. This activation step can be done by the operator by activating both park brake switch devices, for example, simultaneously, or moments within one another, for example within 3 seconds or less. The park brake switch devices generate a pinch or release signal and the park brake controller 22 receives a request for change in the park brake status of the vehicle power unit and the vehicle towed unit. In optional steps 412 and 414 the method of controlling includes generating feedback that the park brake switches have been activated. The park brake controller 22 can receive the parking control request from another controller, such as vehicle dynamics controller 24, via the port 32 or from an off-vehicle source (not shown). In another example, the control logic 38 of park brake controller 22 can independently determine that the vehicle should be parked or released.

In step 416, the control logic 38 determines whether a request for the park mode has been made for power unit 12. If a "pinch to park" request for the park mode has been made for power unit 12 then the logic moves to step 418 and the controller transmits a park signal to the park brakes of both the power unit 12 and the towed unit 14. At step 420 the controller determines whether the whether the changed status of the park brakes was achieved. If the control logic 38 determines that the status of the park brake has been achieved, then feedback device of park brake interface module 20 generates feedback that the status of the park break has been achieved at step 422. If the control logic 38 determines that the changed status of the park brakes was not achieved then a feedback device of park brake interface module 20 generates feedback that the status of the park brake has not been achieved, as depicted at step 424 and the logic returns to the beginning at step 401.

If at step 416 the controller logic 38 determines that a "pinch to park" request for the park mode has not been made for power unit 12, then the logic moves to step 426 where it determines whether a request for the park mode has been made for the towed unit 14. If a "pinch to park" request for the park mode of the towed unit 14 has been made, then the logic proceeds to step 428 and the controller transmits a park signal to the park brakes of the towed unit 14 and transmits a release signal to the park brakes of the power unit 12. At step 430 the controller determines whether the whether the changed status of the park brakes was achieved. If the control logic 38 determines that the status of the park brake has been achieved, then feedback device of park brake interface module 20 generates feedback that the status of the park brakes has been achieved at step 432. If the control logic 38 determines that the changed status of the park brakes was not achieved then a feedback device of park brake interface module 20 generates feedback that the status of the park brake has not been achieved, as depicted at step 434 and the logic returns to the beginning at step 401.

If at step 426 the controller logic 38 determines that a "pinch to park" request for the park mode has not been made for towed unit 14, then the logic moves to step 436 where the controller transmits a release signal to the park brakes of both the power unit 12 and the towed unit 14. At step 438 the controller determines whether the whether the changed status of the park brakes was achieved. If the control logic 38 determines that the status of the park brakes has been achieved, then feedback device of park brake interface module 20 generates feedback that the status of the park brakes has been achieved at step 440. If the control logic 38 determines that the changed status of the park brakes was not achieved then a feedback device of park brake interface module 20 generates feedback that the status of the park brake has not been achieved, as depicted at step 442 and the logic returns to the beginning at step 401.

In any of the foregoing examples, park brake controller 22 transmits the parking brake control message via port 32 using the communication paths 30 and 40 to the park brakes 21 and 45. In one example, the communication path 38 is a hard-wired serial communications bus. In another example, the communication path 38 is the wireless path wherein the park brake controller 22 uses the antenna module (not shown) to transmit messages.

Figure 25:
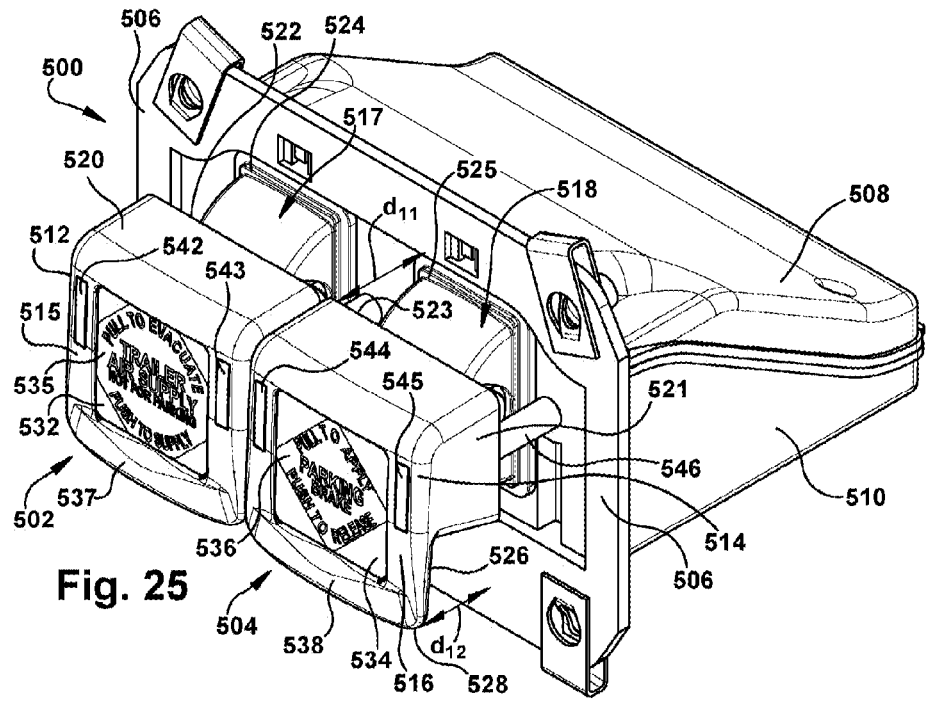
FIGS. 25 and 26 is a perspective view and a front view illustration, respectively, of a park brake interface module having two park brake switch devices shown in a neutral state, according to another example embodiment of the present invention.

In accordance with another example of the present invention, FIG. 25 presents a perspective view illustration of a park brake interface module 500 which includes park brake switch devices 502 and 504, which are actuator switch devices. As shown, park brake switch devices are at least partially housed by front panel 506, housing 508, and base 510 which can be separate components or each of which may be combined in various integrated arrangements. Park brake interface module 500 can be mounted into a dashboard of a vehicle as shown in FIGS. 9-12, for example dashboard 94. In another example, park brake interface module 500 can include a single park brake switch device rather than two as shown in FIG. 25.

The park brake switch devices 502 and 504 include actuation members 512 and 514, each also known as an "actuation button" which is movable and engaged by an operator or driver to apply or release the park brake for a vehicle, for example park brakes for a tractor vehicle, a trailer vehicle, or both. The general shape of the actuation buttons 512 and 514 is generally substantially square as shown, although the actuation buttons can have an alternative shape, for example, round, triangular, rectangular, etc. Actuation buttons 512 and 514 optionally include outer frame 515 and 516 which trim the perimeter of the buttons. Park brake switch devices 502 and 504 each include an electromechanical switch 517 and 518, respectively, connected to the actuation buttons. Each actuation button includes housing, such as, housing 520 of actuation button 512 and housing 521 of actuation button 514. Top wall 522 of housing 520 extends over at least a portion of electromechanical switch 517 and top wall 523 of housing 521 extends over at least a portion of electromechanical switch 518. The perspective view of FIG. 25 reveals a finger pad 526 along at least a portion of the back side of the actuator button 514 and opposite front panel 506 which extends downward from actuator button housing 521 to the base 528 of actuator button 514. The operator can place one or more fingers on finger pad 526 to pull the activation button away from front panel 506 of interface module 500, for example toward the operator during operation.

Front surfaces 532, 534, of actuation buttons 512 and 514 shown in FIG. 25 are oriented in the same plane and are substantially parallel to the front panel 506 of park brake interface module. Front surfaces 532 and 534 are surrounded by frames 515 and 516 optionally include indicia 535 and 536, for example, which are molded into the actuator buttons or printed directly on surface of actuator button or onto a label. For example, indicia 535 indicates that actuation button 512 on the left is for operator control of the air supply (i.e. air purge) for the parking brake of a towed vehicle unit, such as a trailer, and indicia 536 indicates that actuation member 514 on the right is operator control of the parking brake of tractor unit. The front surface of the actuation buttons 512 and 514 can optionally include projected areas 537 and 538, respectively, along bottom of frames 515 and 516 to make it easier for an operator or driver to push the bottom portion of the activation button toward front panel 506 of interface module 500 in a direction away from the operator during operation.

Park brake switch devices 502 and 504 can include electromechanical switches that are two-position switches, three-position switches, or combinations thereof. The example park brake switch device of FIG. 25 shows actuation members or actuation buttons 512 and 514 in a neutral position of a three-position switch. In the neutral position as shown the housing walls 522 and 523 of the actuation members 512 and 514 are located a distance du from a reference point such as front panel 506, or in another example, covers 524 and 525 of electromechanical switches 517 and 518. Finger pad 526 is located a distance d12 from the same reference points, front panel 506 and switch covers 525 and 526. In the example as shown, the front surface 532 of actuation member 512 and the front surfaces 534 of actuation member 514 lies in the same plane and both are substantially parallel to front panel 506.

Figure 26:
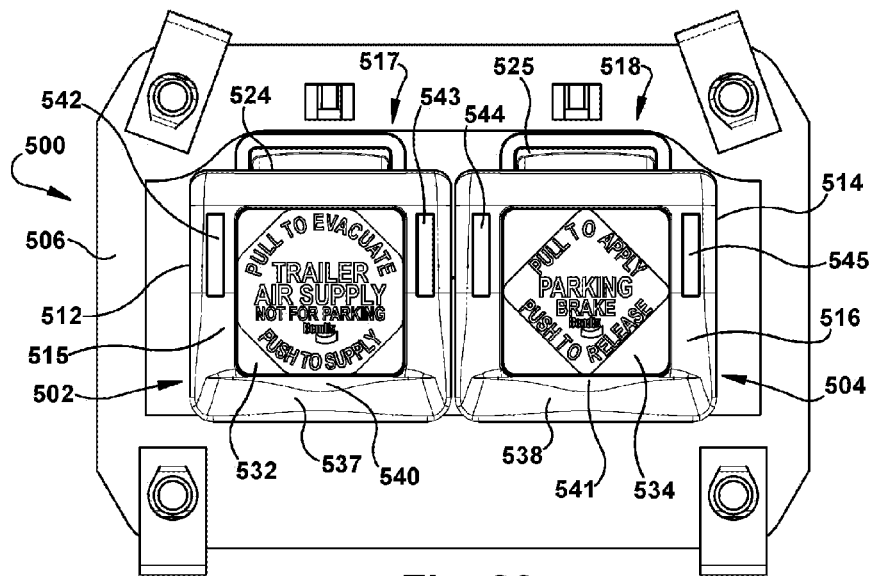

In another example of the present invention, park brake interface module 500 includes at least one feedback device 542, 543, 544, and 545 to provide information to the driver or operator. For example, the feedback devices of actuation member 512 include at least one or at least two lenses, for example lenses 542 and 543, and the feedback devices of actuation member 514 can include at least one or at least two lenses, for example lenses 544 and 545. The lenses 544 and 545 focus light to provide a feedback signal to indicate the status of the park brakes of power unit 12 (FIG. 1), towed unit 14 (FIG. 1). Feedback devices that are indicator lights can light up or be in the "on" mode when the park brakes are applied, whereas no light is emitted from the lenses when the park brakes are in the "off" mode, for example. As discussed above with respect to the variety of example park brake interface modules described above (e.g. park brake interface modules 20, 65, 500), a feedback device 542, 543, 544, and 545 can also provide a feedback signal in response to a change in state of the park brake switch devices 517 and 518, the park brakes 21 and 45 (FIG. 1), or both. Feedback device can also indicate warning messages regarding any faulty issue with the park brake or any of the systems in the vehicle. The feedback messages that use light are visual, however, feedback can also be provided via sound, haptic, or other visual messages to the operator. FIG. 26 is a front view illustration of the same park brake interface module 500 shown in FIG. 25 with the actuation buttons 512 and 514 in the neutral position. A close up view of actuation buttons 512 and 513 shows the projected areas 537 and 538 can optionally include concave surfaces 540 and 541 which can allow for improved gripping of the actuation button by the operator, for example when the actuation button is pushed.

Figure 27:
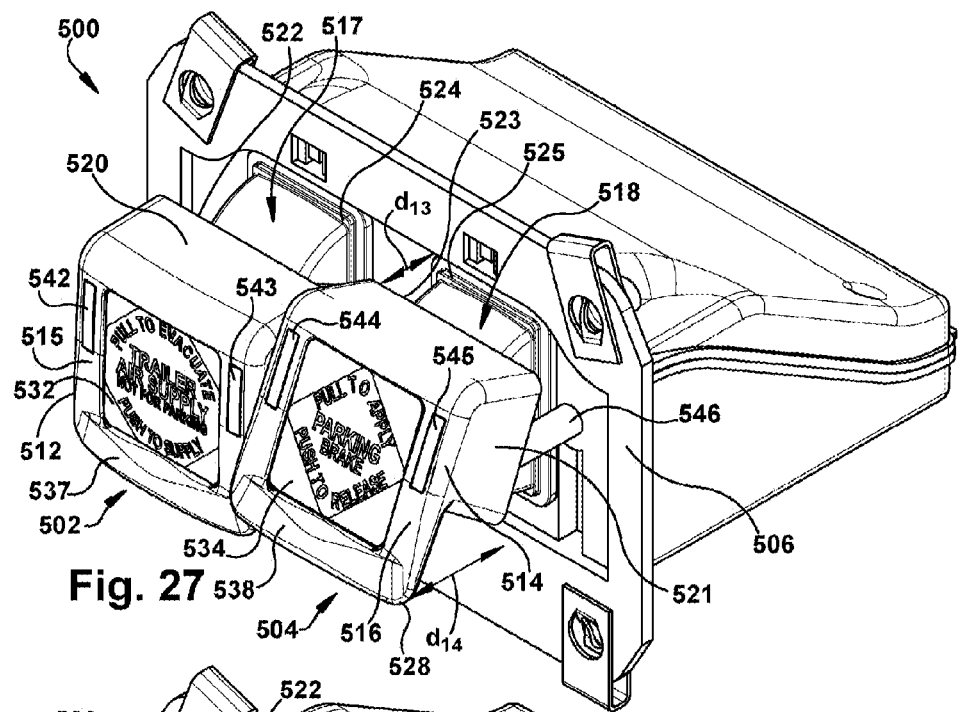
FIGS. 27 and 28 are perspective view illustrations, of the park brake interface module of FIGS. 25 and 26, showing an actuation button in a park apply position, and an actuation button in a park release position, respectively, according to another example of the present invention.

FIG. 27 shows the front view of park brake inter-face module 500 with park brake switch device 504 in the "brake-apply" state. The housing wall 523 of actuation member 514 is moved toward the front panel 506 and/or cover 525 of electromechanical switch 518, either of which can be considered a "target member" and the actuation member 504 is in a park brake apply mode. Wall 523 of housing 521 of actuation member 514 is located a distance d13 from front panel which is proximate front panel 506 and cover 525 of switch 518. Distance d13 is less than distance du (FIG. 25) in the neutral position. Housing wall 523 of the switch device is moved closer to the panel 506 and cover 525, in a "pinch" mode relative to targets, in order to apply the parking brake. At the same time, the finger pad 526 of the actuation button 514 is distal to front panel 506 and provides the driver a sense of a "pull" motion in applying the park brake. Finger pad 526 of actuation member 514 is distal to front panel 506 and located a distance d14 from front panel, where distance d14 is greater than distance d12 which is the distance between finger pad 526 and front panel 506 or switch cover 525 shown in the neutral position (FIG. 25). Also, d13, the distance between housing wall 523 to front panel 506 or cover 525 of switch 518 is less than distance d14, the distance between finger pad 526, for example at base 528, of actuation member 514.

Figure 28:
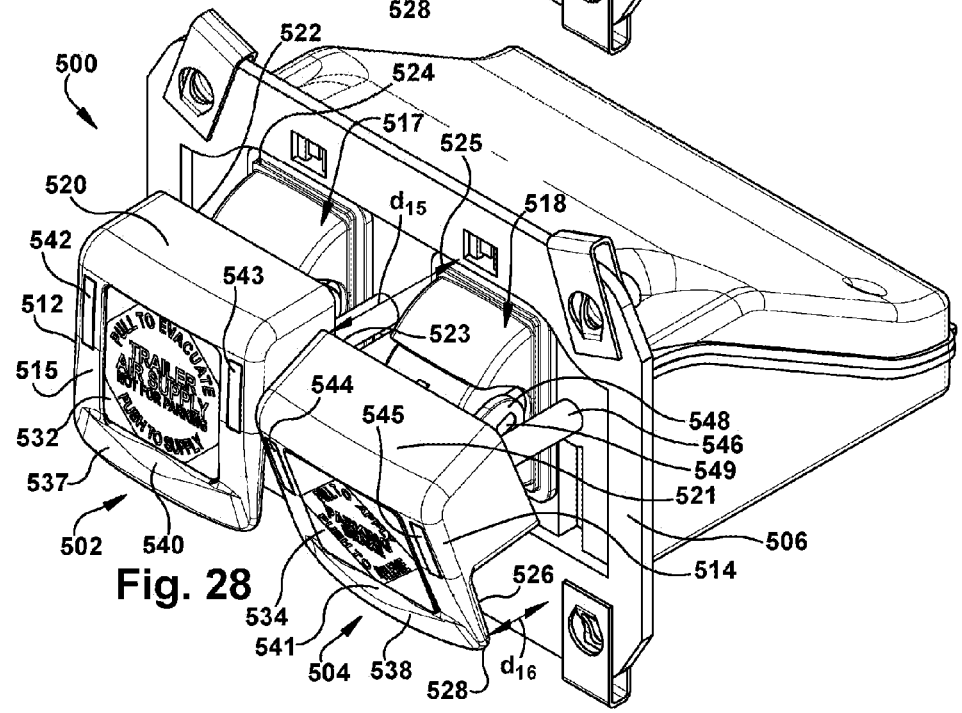

FIG. 28 shows the front view of park brake inter-face module 500 with park brake switch device 502 in the neutral position and park brake switch device 504 in the park brake release mode. The top wall 523 of housing 521 of actuation member 514 is moved away from the front panel 506 and/or cover 525 of electromechanical switch 518, or in other words away from these "target members" or points of reference, such that actuation member 504 is in a park brake release mode. Housing wall 523 of actuation member 514 is distal to front panel 506 and located a distance d15 from front panel and cover 525 of electromechanical switch 518 or from switch cover 525, where distance d15 is less than distance du shown in the neutral position (FIG. 25) and also less than d13 shown in the "brake-apply" state (FIG. 27). As housing wall 523 of the switch device is moved further away from the panel to apply the parking brake, at the same time, the finger pad 526 of actuation button 514 is moved toward the panel 506. Activation of the actuation button in the release mode can be accomplished by a "push" motion, for example in pushing protrusion 538 toward front panel 506 to release the park brake. Finger pad 526 of actuation member 514 is proximate to front panel 506 and located a distance d16 from front panel, where distance d16 is less than distance d12 of finger pad 526 in the neutral position (FIG. 25). The distance d15 which is the distance between housing wall 523 to front panel 506 or cover 525 of switch 518 is greater than distance d16, the distance between finger pad 526, for example at base 528, of actuation member 514.

With reference to FIGS. 25-28, in another example, the park brake interface module 500 includes at least one feedback device, for example lenses, 542, 543, of actuation member 512, and lenses 544 and 545 of actuation member 514. Light pipe 546 provides light to lens 545 for a visual form of feedback. As discussed above with respect to alternative examples, a feedback device can also provide a feedback signal in response to a change in state of the park brake switch device, the park brakes, or both. For example feedback device 545 can indicate whether the park brake of power unit 12 has been actuated by the driver. In another example, park brake interface module can optionally include a second feedback device 545 that can indicate something different than feedback device 544. For example, feedback devices can indicate whether or not an operator requested a change of status of the park brake. In another example, feedback device can be a light that blinks during the lag time between the operator's request for change and the actual change in status of the park brakes. Feedback device can also indicate warning messages regarding any faulty issue with the park brake or any of the systems in the vehicle. The feedback messages can be visual, or haptic, or provided via sound to the operator.

In another example, the park brake interface module 500 shown in FIG. 25 through FIG. 28 can include at least one actuator member that is pivotally mounted to electromechanical switch. FIG. 28 shows that actuation button 514 includes arm 548 that extends rearward from the actuation button toward both switch 518 and panel 506. Pin 549 connects arm 548 to switch 518 and arm and actuation button can pivot about the pin to move the actuation button 514 between the park brake apply mode (FIG. 27) and park brake release mode (FIG. 28).

Figure 29:
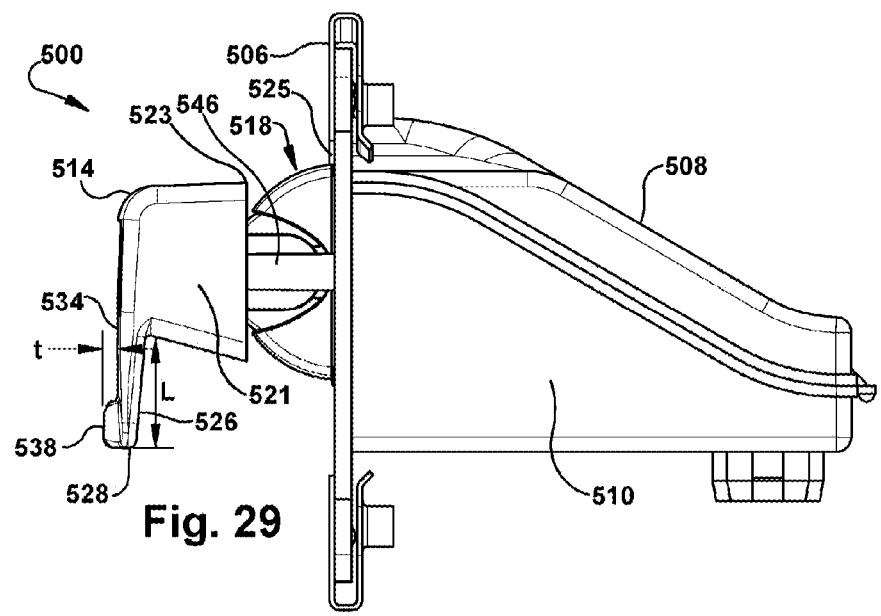
FIGS. 29 and 30 are side and top view illustrations, respectively, of the park brake interface module of FIGS. 25 through 28 illustrating the park brake switch devices in a neutral state, according to another example of the present invention.
Figure 30:
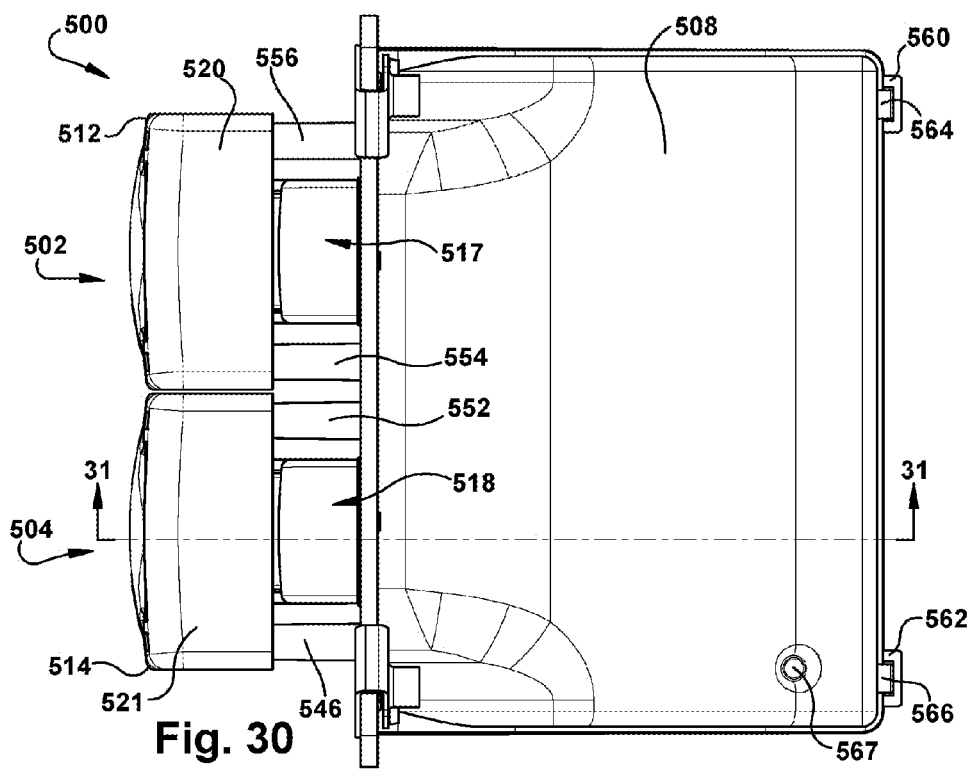

FIGS. 29 and 30 are side and top view illustrations of a park brake interface module of FIGS. 25 through 28 illustrating the park brake switch devices in a neutral state and illustrating light pipes 546, 552, 554 and 556 which extend from front panel 506 to actuation buttons. The side view illustration of FIG. 29 shows that finger pad 526 having a length L extends downward from housing 521 of actuator button 514. The length L can vary as desired to provide adequate surface for fingers of an operator or driver. Front surface of the actuation button 514 can optionally include a projected area 538 which has a thickness, t, that can vary depending upon the area desired for proper grip of the front surface of actuator button 514, for example when the actuator button 514 is pushed toward front panel 506 or switch cover 525 in activating the park brake release mode. The top view of park brake interface module 500 reveal additional light pipes 552, 554 and 556 that direct light toward lenses 544, 543 and 542, respectively (FIGS. 25-28). The top view of park brake interface module 500 also shows that base 510 has brackets 560 and 562 that receive hinges 564 and 566 of housing 508. Also, housing and base are connected by fastener 567.

Figure 31:
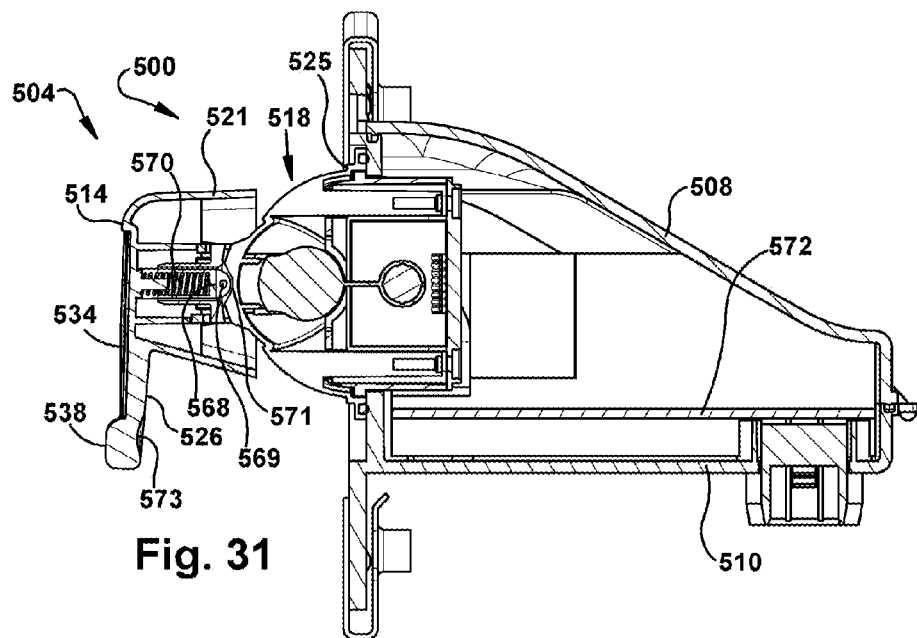
FIGS. 31 and 32 are cross-sectional side view and cross-sectional perspective view illustrations taken across lines 31-31 of the park brake interface module FIG. 30 shown with the park brake switch devices in a neutral state, according to an example embodiment of the present invention.
Figure 32:
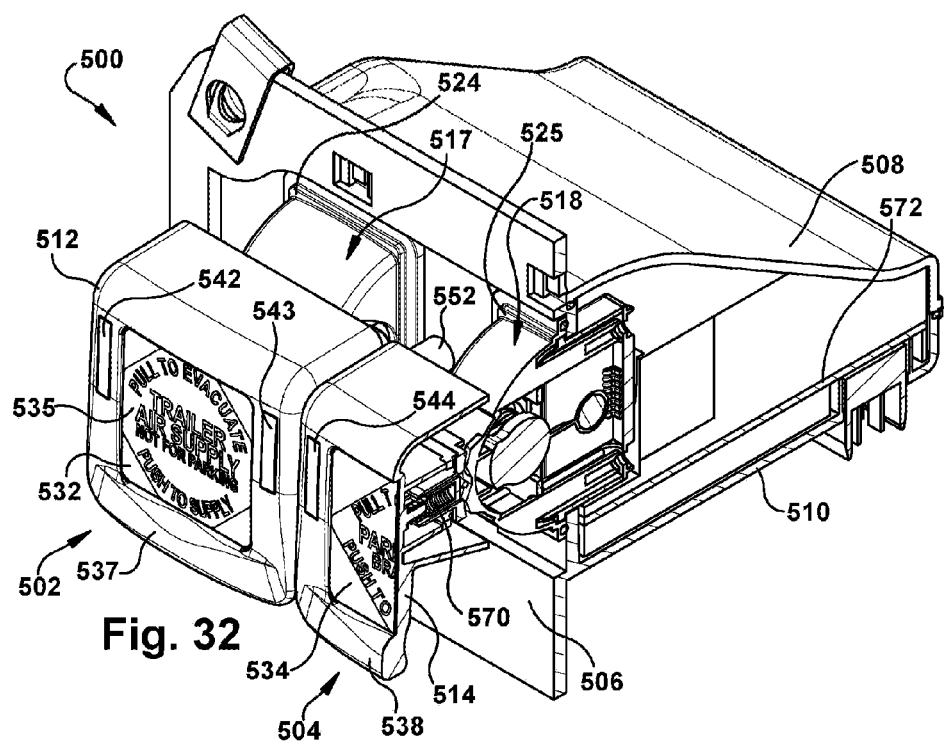

FIGS. 31 and 32 are cross-sectional side view and perspective view illustrations taken across lines 31-31 of the park brake interface module FIG. 30 with the park brake switch devices shown in a neutral state, according to an example of the present invention. The cross-section views of FIGS. 31 and 32 show several internal components of the park brake interface module 500, and particularly the internal components of park brake switch device 504. Inside housing 521 of actuator button 514 includes an arm 568 which rotates about pin 569 when the actuation button 514 is moved between the park brake "apply" and the park brake "release" modes. Spring 570 provides a bias or resistance for the arm to apply pressure against detent 571 of cover 525 of the electromechanical switch 518. Printed circuit board 572 provide the logic 35 (FIG. 1) associated with park brake controller 20 (FIG. 1) as an interface between park brake input module and park brakes 21 of power unit 12, and optionally, park brakes 45 of towed unit 14.

Figure 33:
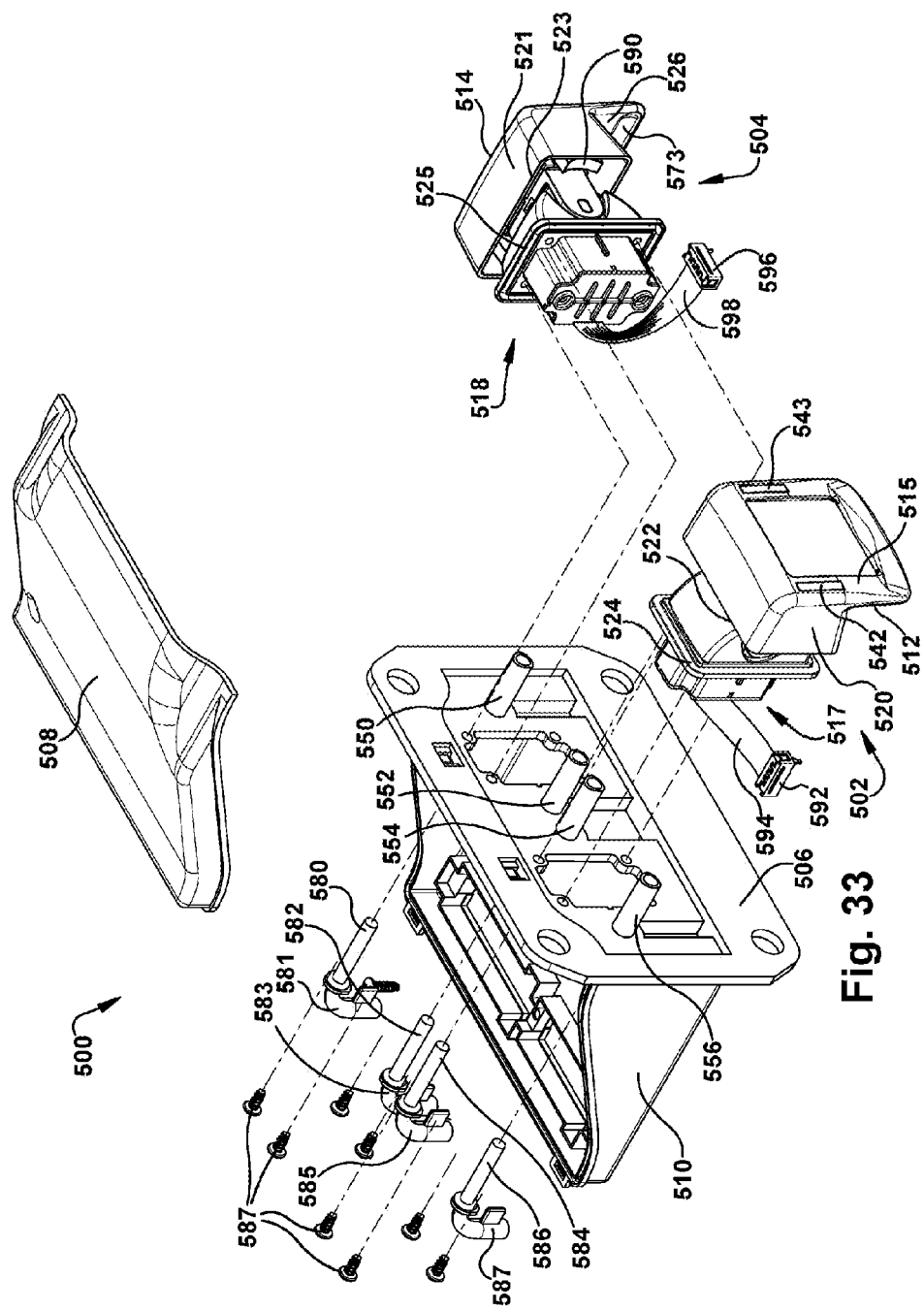
FIG. 33 is an exploded perspective view of the park brake interface module of FIGS. 28 through 32 illustrating the internal components, according the an example of the present invention.

FIG. 33 is an exploded perspective view of the park brake interface module of FIGS. 28 through 32 illustrating the internal components, according an example of the present invention. Park brake switch device 502 and 504 include electromechanical switches 517, 518. In one example the switches include least one sensor including, but not limited to, magnetic sensors, capacitive sensors, inductive sensors, resistive sensors, and combinations thereof. Inside housing 508 of interface module 500, light pipes 546, 552, 554 and 556 are in line with L-shaped light pipes 581, 583, 585 and 587 which are connected to the assembly via fasteners 588, for example screws. The rear of actuator button 514 shows a light pipe 590 which is disconnected yet substantially aligned with lens 544 (FIGS. 25-32), or alternatively, light pipe 590 is the rear portion of lens 544. The light from the LED on the Printed Circuit Board 572 is transmitted through the "L" shaped light pipes 581, 583, 585 and 587 and thru the light pipes 546, 552, 554, 556. In an example embodiment there is a small gap between the end of light pipes 581, 583, 585 and 587 and light pipe 590. In another example, the end of light pipe 590 has an arcuate shape which allows the actuation button 514 to change positions between the park brake apply mode and the park brake release mode while also maintaining the gap between light pipes 590 and light pipe 544 and allows the light to exit to the front of the actuation button 514 with the switch at any position, for example along its pivot arc when the actuation button is pivotally mounted to the electromechanical switch 518. The electromechanical switches 517 and 518 are connected to circuit board 572 (FIGS. 31 and 32) via electrical connectors, for example connector 592 attached to ribbon cable 594 and connector 596 which is attached to ribbon cable 596. Electromechanical switches 517 and 518 are secured to actuation buttons 512, 514 at another end of the switches, respectively.

Figure 34:
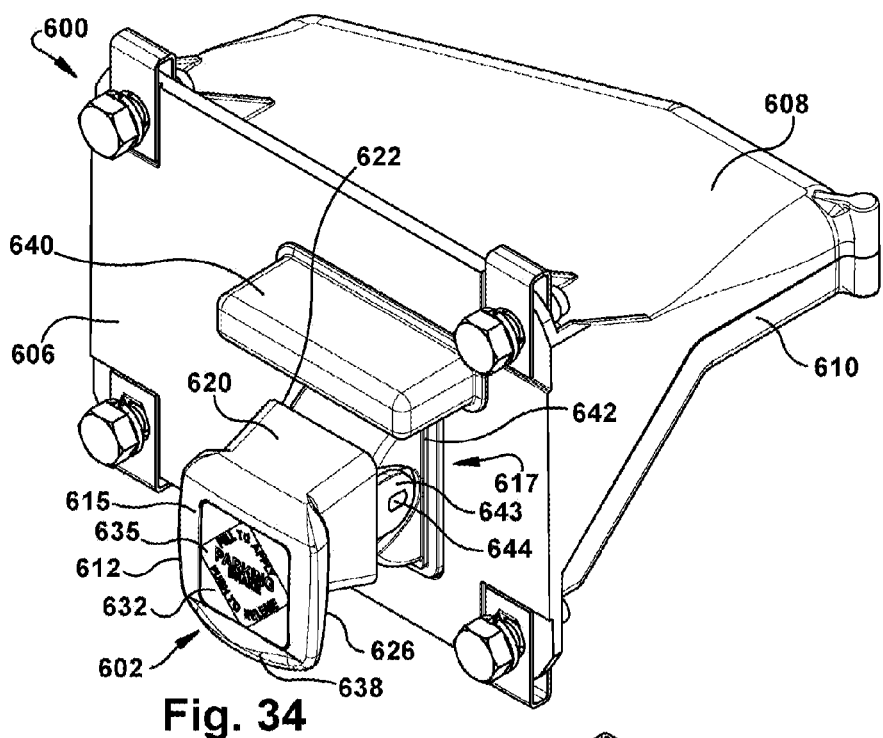
FIGS. 34 and 35 are top and bottom perspective view illustrations of a park brake interface module, according to another example embodiment of the present invention.
Figure 35:
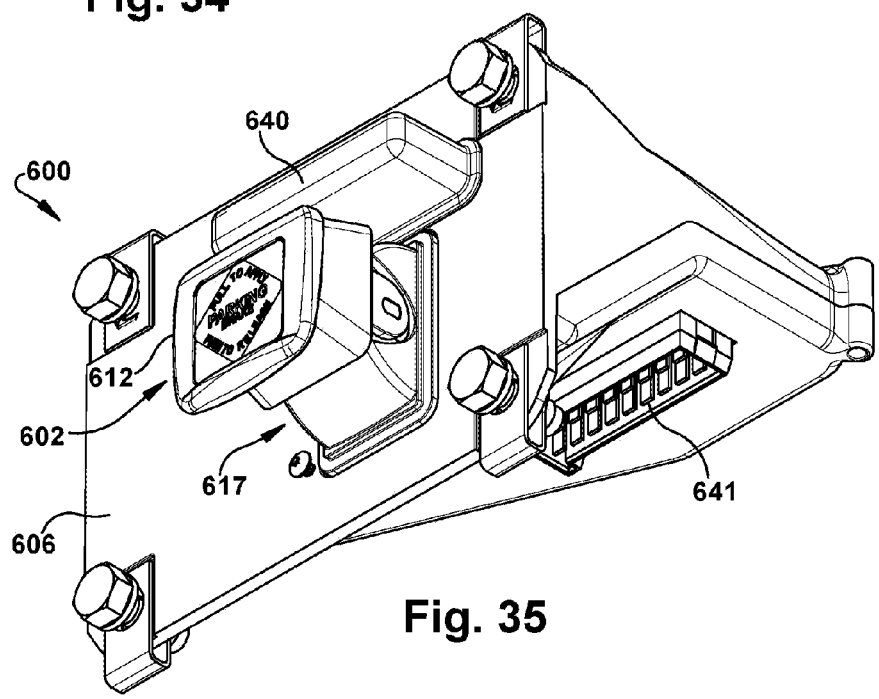

FIGS. 34 and 35 are top and bottom perspective view illustrations of a park brake interface module 600, according to another example embodiment of the present invention and illustrating a single actuation button. Park brake interface module 600 includes park brake switch device 602, front panel 606, housing 608, and base 610. Actuation member or actuation button 612 has a front surface that includes an outer frame 615. Park brake switch device 602 includes an electromechanical switch 617 connected to the actuation button 612. Actuation button includes housing, such as, housing 620 and top wall 622 of housing 620 extends over at least a portion of electromechanical switch 617. Actuator button 612 includes a finger pad 626 along at least a portion of the back side of the actuator button 612 and opposite inside panel 606 and on the opposite surface from front surface 632 and indicia 635 of actuation button 612. Finger pad 626 extends downward from actuator button housing 620 to the base near protruded area 638 of actuator button 612. As in the examples shown in FIGS. 25-33 the operator can place one or more fingers on finger pad 626 to pull the activation button away from front panel 606 of interface module 600 or a dashboard, for example toward the operator during operation.

Feedback device 640 extends across at least a portion of front panel 606 above actuation button 612. Feedback device 640 provides a signal that includes but is not limited to a visual signal, an auditory signal and a haptic signal. Feedback device 640 also serves as a "target member" described in several embodiments herein, according to the present invention. For example wall 622 of housing 620 of actuation button 612 can be moved toward the feedback device 640 in a park brake apply mode or a "pinch to park" mode, and can be moved away from feedback device 640 in a park brake release mode. The bottom perspective view of FIG. 35 shows connector 641 which electrically connects park brake interface module to the controller of the vehicle (FIG. 1). In another example park brake module 600 can include an actuator member that is pivotally mounted to electromechanical switch. FIG. 34 shows that actuation button 612 includes arm 643 that extends rearward from the actuation button toward both switch 617 and panel 606. Pin 644 connects arm 643 to switch 617 such that arm and actuation button can pivot about the pin to move the actuation button 612 between the park brake apply mode and park brake release mode in the same manner as shown in FIGS. 27 and 28 with respect to actuation button 514 of park brake interface module 500.

Figure 36:
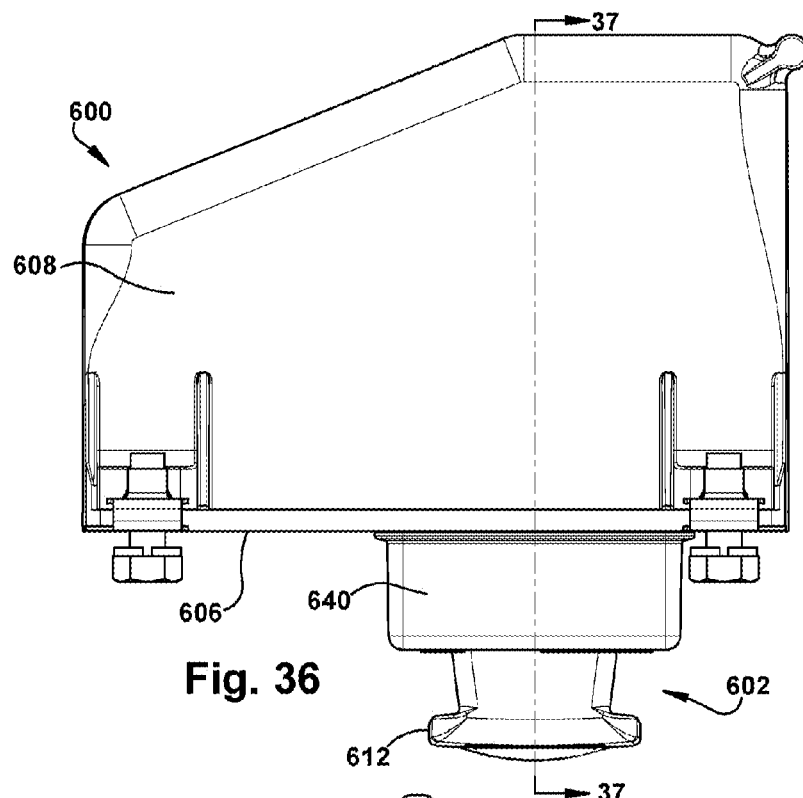
FIG. 36 is a top view illustration of the park brake interface module of FIGS. 34 and 35, according to example embodiments of the present invention.
Figure 37:
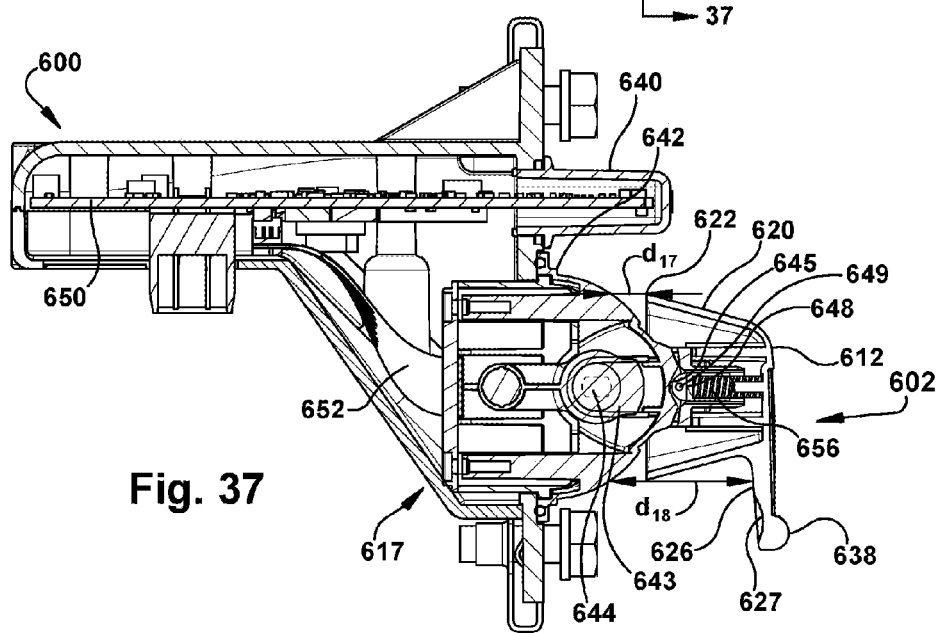
FIG. 37 is a cross-sectional illustration taken along lines 37-37 of the park brake interface module of FIG. 36, according to example embodiments of the present invention.

FIG. 36 is a top view of the park brake interface module 600 and shows the feedback device 640 extends outward beyond the front panel 606 and that the actuator button 612 extends further outward beyond both front panel 606 and the feedback device 640. FIG. 37 is a cross-sectional view of the park brake interface module 600 taken along the lines 37-37 of FIG. 36. The finger pad 626 of actuation button 612 optionally includes a concave surface for a positive grip. The cross-section illustrates internal components of the actuator button 612 and switch 617. Cover 622 of switch 617 includes detent 645 for receiving arm 648 which rotates about pin 649 when the actuation button 612 is moved between the park brake "apply" and the park brake "release" modes. Spring 656 provides a bias or resistance for the arm 648 to apply pressure against detent 645 of cover 622 of the electromechanical switch 617. Electromechanical switch 617 and ribbon cable 652 are connected to printed circuit board 650 which provides the logic 35 (FIG. 1) associated with park brake controller 20 (FIG. 1) as an interface between park brake input module and park brakes 21 of power unit 12, and optionally, park brakes 45 of towed unit 14.

FIGS. 38 and 39 are top and bottom perspective view illustrations of a park brake interface module 660, according to another example embodiment of the present invention. Park brake interface module 660 includes two park brake switch devices 602 and 662. Park brake switch device 662 includes actuator button 664 and electromechanical switch 665 having a cover 670. Actuation button or member 664 includes finger pad 674. Feedback device 675 extends at least partially across front panel 606 such that it extends above both actuation members 612 and 664. FIG. 39 shows the connectors 680 associated with second park brake switch device 662.

Figure 40:
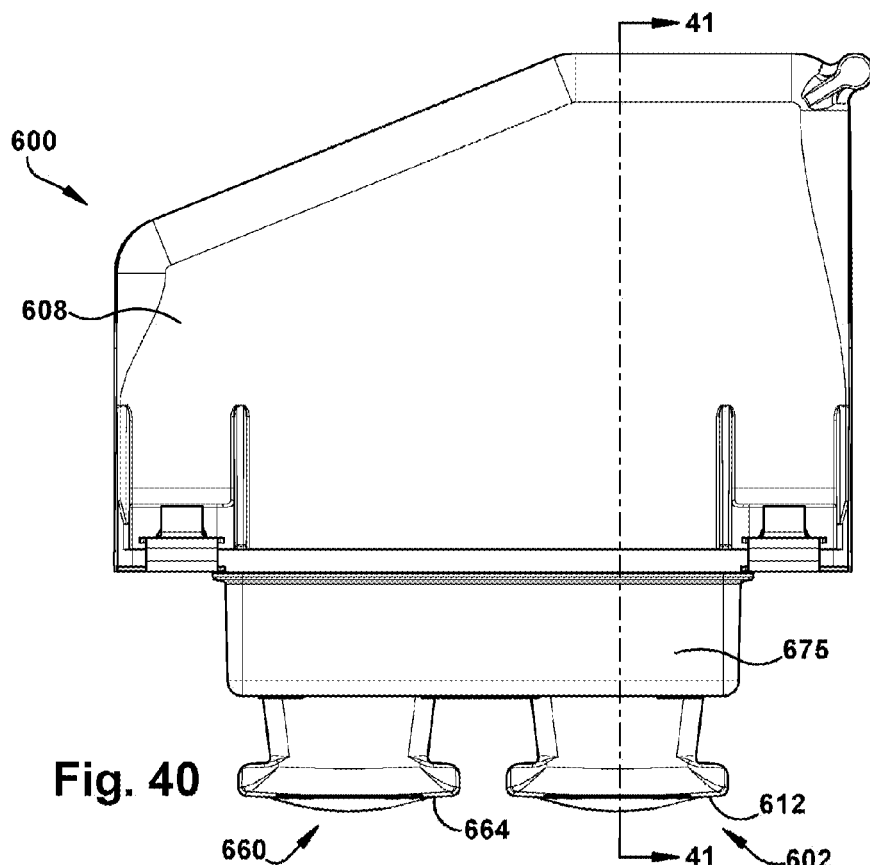
FIG. 40 is a top view illustration of the park brake interface module of FIGS. 34-39, according to example embodiments of the present invention.
Figure 41:
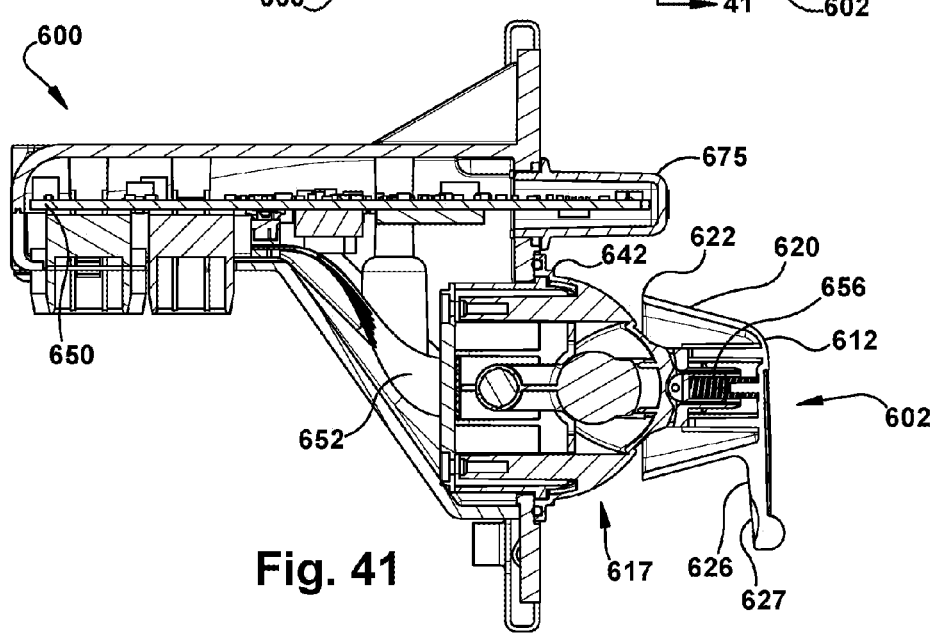
FIG. 41 is a cross-sectional illustration taken along lines 41-41 of the park brake interface module of FIG. 40, according to example embodiments of the present invention.

FIG. 40 is a top view of the park brake interface module 600 and shows the feedback extends beyond the front panel 606 and that the actuator button 612 extends further beyond the feedback device. FIG. 41 is a cross-sectional view of the park brake interface module 600 taken along the lines 37-37 of FIG. 36. The cross-section illustrates internal components of the actuator button 612 and electromechanical button as described above with respect to FIG. 37 illustrating a single park brake switch device.

In any of the foregoing examples, park brake interface modules 500, 600, and 660 are electrically connected to park brake controller 22 (FIG. 1). For example controller receives an electronic signal from park brake switch devices to indicate a park brake apply mode or a park brake release mode. Park brake controller 22 transmits the parking brake control message via port 32 using the communication paths 30 and 40 to the park brakes 21 and 45. In one example, the communication path 38 is a hard-wired serial communications bus. In another example, the communication path 38 is the wireless path wherein the park brake controller 22 uses the antenna module (not shown) to transmit messages.

A method for applying a vehicle park brake of a vehicle includes moving an actuation member of a park brake switch device, for example park brake switch devices, for example park brake switch devices 517, 518, 602, and 662 toward a target member of the a park brake interface module and generating a pinch signal to apply the vehicle park brake. The vehicle park brake is in the brake apply mode when the actuation member is proximate the target member. Example methods of applying the park brake of a vehicle having park brake interface modules 500, 600 and 660 are described above in reference to FIGS. 23 and 24.

Figure 42A:
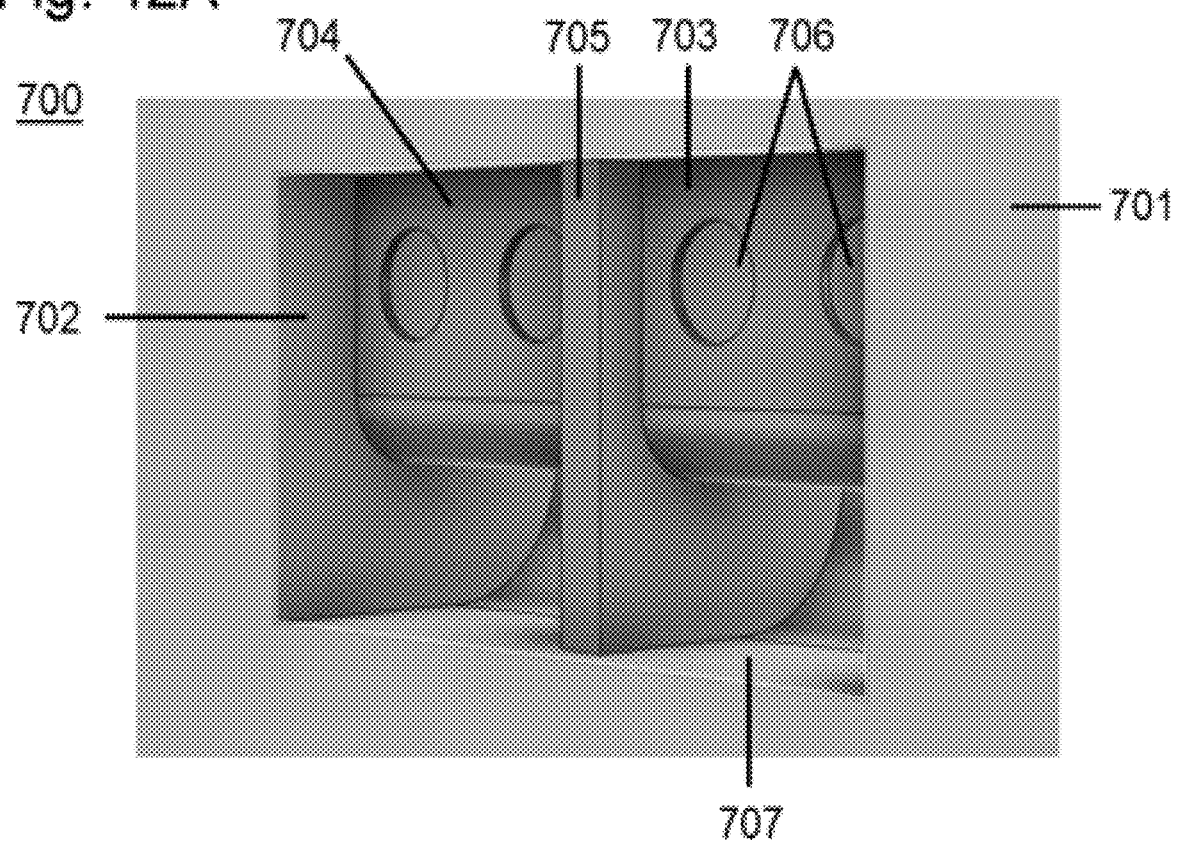
FIGS. 42A and 42B are perspective elevation views of a park brake interface module, according to an example embodiment of the present invention.
Figure 42B:
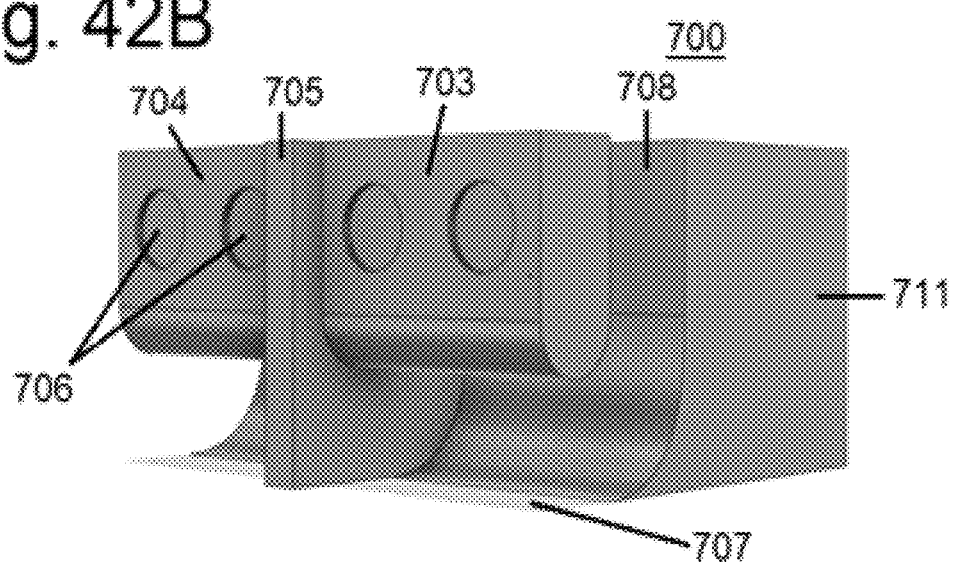
Figure 43:
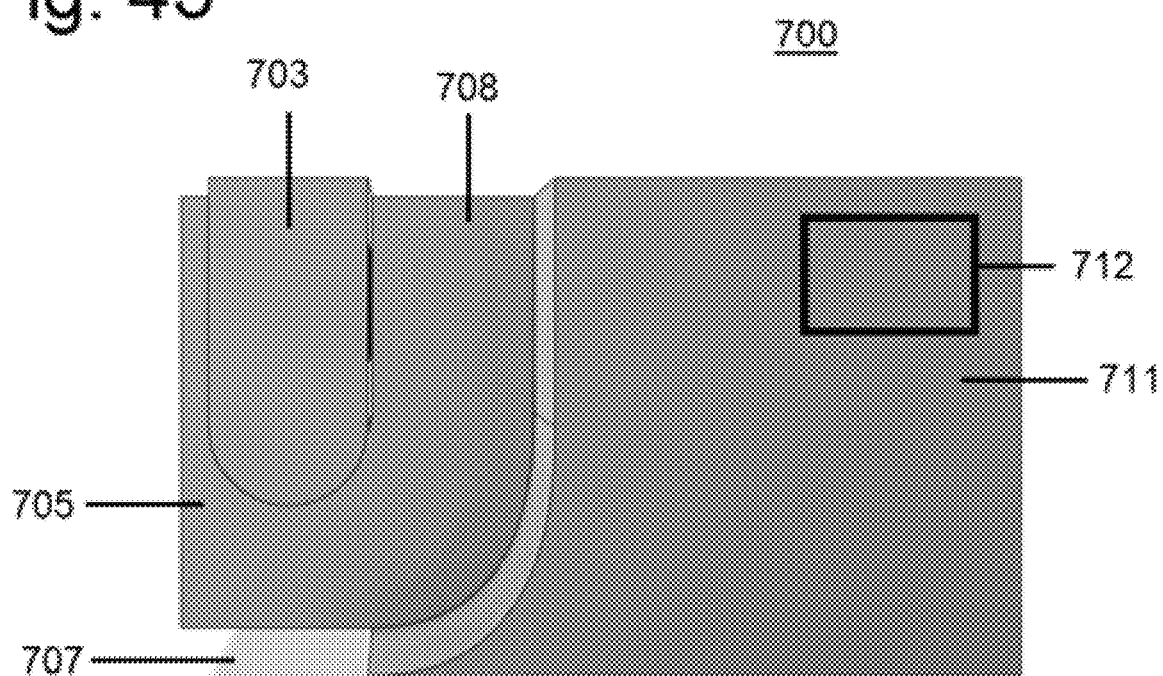
FIGS. 43 and 44 are side elevation and rear perspective views of the park brake interface module of FIGS. 42A-42B, according to an example embodiment of the present invention.
Figure 44:
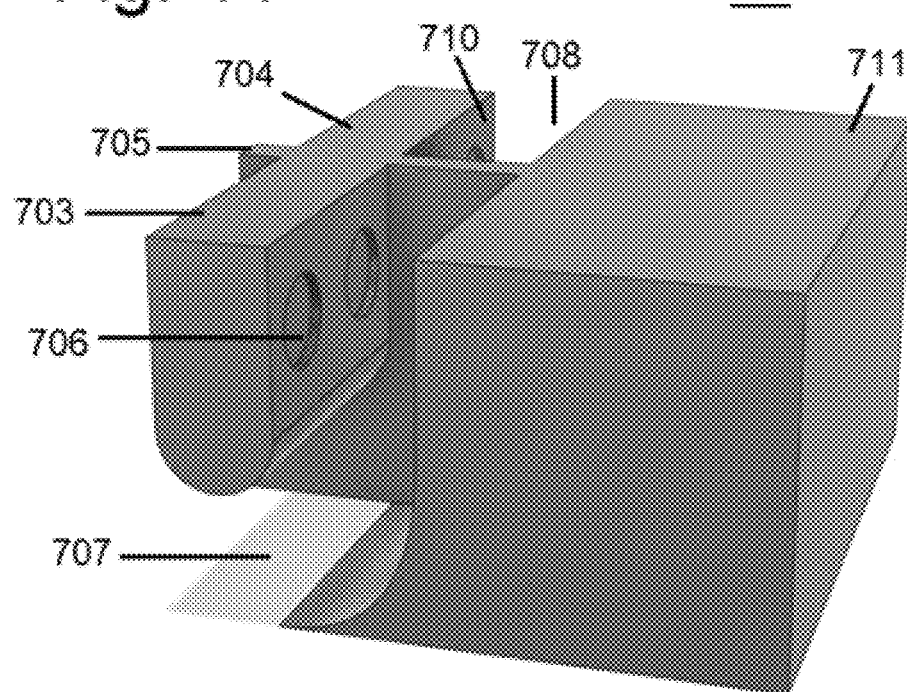

Another embodiment of the present invention is shown in FIGS. 42-44. In this embodiment the park brake interface module is designed as a flush-mounted or recessed unit. This arrangement minimizes the potential for accidental actuation of the switches. Further, in this embodiment the elements corresponding to the previous embodiments' switches are fixed structures, with sensing elements embedded to sense a driver's intention to actuate a switch to release or apply a parking brake.

FIG. 42A shows a park brake interface module 700 arranged in a vehicle dash panel 701, while FIG. 42B shows the park brake interface module 700 with the dash panel removed for clarity. FIGS. 43 and 44 shown additional orientations of this park brake interface module. In this embodiment a recessed region 702 includes two fixed switch elements 703, 704, which are separated by a divider 705. The switch element 703 is associated with the parking brakes of the tractor. The switch element 704 is associated with the trailer parking brakes.

A recess entrance 707 is provided below the lower edges of the fixed switch elements 703, 704. The recess entrance 707 leads to a rear recess 708 behind the fixed switch elements, as also shown in FIGS. 43 and 44. The recess entrance 707 and rear recess 708 are sized to permit entry of at least two of the driver's fingers into the region behind the fixed switches, and preferably are sized large enough for gloved fingers to enter. The reason for access by two fingers is discussed further below. In one embodiment of the recessed park brake interface module 700, the rear recess 708 is located between the switches 703, 704 and a rear compartment 711 which houses control electronics 712 which are configured to receive actuation signals from the sensors 706 of the fixed switch elements 703, 704, and to control the sensors 706 to generate feedback signals perceptible by the driver. The feedback signals are not limited to haptic signals, but may include other signals such as sound and/or light signals.

Sensors 706 are located at or near the outer and inner surfaces of the switch elements 703, 704, with at least two sensors located on the front and rear faces of each of the switch elements 703, 704. These sensors are arranged to permit the driver to actuate or release parking brakes with the familiar "pull or push" action of older mechanical controls. For example, when the driver places two fingers into the rear recess 708 and pulls the rear surface 710 of tractor park brake switch 703 toward himself, the sensors 706 detect the driver's intent to apply the tractor parking brakes and sends an appropriate "brake apply" signal to the parking brake controller. Similarly, a driver's pushing on the front surface of tractor park brake switch 703 would result in the front-facing sensors sending "brake release" signal to the brake controller.

Preferably, each front and rear surface of the switch elements 703, 704 requires at least two fingers to actuate a park brake apply or release action, i.e., each of the four front and rear switch element surfaces would need to a force from the driver's fingers for the parking brake position switch request to be honored. This arrangement is intended to minimize the potential for inadvertent parking brake operation in response to a single unintentional contact with the park brake interface module 700. Further, preferably the rear recess 708 is divided into separate regions by the divider 705, thereby minimizing the potential for the driver's fingers to inadvertently contact and actuate two switch elements when only one was intended to be used. A time requirement may also be incorporated into the system, whereby a minimum length of switch actuation duration must be met for the system to recognize the applied force to be a deliberate act, rather than an inadvertent contact.

In response to the drivers "push" or "pull" on a switch element, the park brake interface module 700 may be configured to provide haptic or other feedback to the driver's fingers, in addition to any other indications such as light or sound signals. For example, the sensors 706 may be piezoelectric elements that not only generate a voltage signal when pressed by a driver finger, but also may be controlled to generate vibration signals perceptible by the drivers fingers. Such signals may include a unique feedback vibration profile to indicate successful receipt of an apply or release signal. Preferably, the piezo sensors may be controlled to generate more complex haptic signals in the period between the push or pull of a switch element and the completion of the associated supply or release of air to/from the parking brake chambers. For example, the sensors may generate vibrations that mimic the pulses a driver would feel during actuation of the prior mechanical controls, such as an air admission impulse felt when a pneumatic switch is operated or the feeling of the feedback at the pneumatic switch as the air pressure in the downstream air lines decreases or increases. Such feedback generated by piezo sensors would provide a driver with a familiar sensation as the fixed switch elements 703, 704 are pushed and pulled upon. In addition, in response to an incorrect actuation (e.g., only one sensor output being generated when the driver intended to actuate both sensors on the surface of a switch element) the piezo switches may be controlled to generate a negative feedback vibration indicating the attempt to push or pull the switch element was not successful. The control of the sensors' feedback may be based on a predetermined vibration profile, or more preferably may be based on the actual pneumatic line pressure sensor signals generated during the parking brake state change.

The haptic feedback provided by the sensors 706 may be coupled with illumination of signal lights such as LEDs integrated into the front faces of switch elements 703, 704 or located elsewhere on the park brake interface module 700 or elsewhere in the driver's view, such as on a separate dashboard panel.

The present invention is not limited to the use of piezoelectric sensor elements. Other sensor elements that would generate a parking rake apply or release signal when the fixed switch elements 703, 704 are pushed or pulled by a driver may be used, such as membrane switches, momentary-contact microswitches, infrared sensors, optical imaging sensors, capacitive and resistive display overlays, temperature sensors, and acoustic pulse recognition sensors.

The present invention is also not limited to a particular location in a dash panel, but may be located elsewhere as long as the fixed switch elements with front and rear "push-pull" surfaces are present and are within reach of a seated driver. For example, the park brake interface module may be installed as a standalone unit at any location within the driver's reach, for example on the top surface of a dashboard, integrated with a surface such as a large instrumentation display, on a steering wheel, on an armrest, etc.

Optionally, a retractable hood may be provided as a safety measure to block access to the control zones. This hood may be manually operated or may be configured to descend if the vehicle is in autonomous mode, ensuring if there is a driver present there is no accidental actuation of one of the parking brake switch elements. Further, the hood may cover the switch elements as part of the key off cycle the hood, to guard against inadvertent release of the parking brakes.

Figure 45:
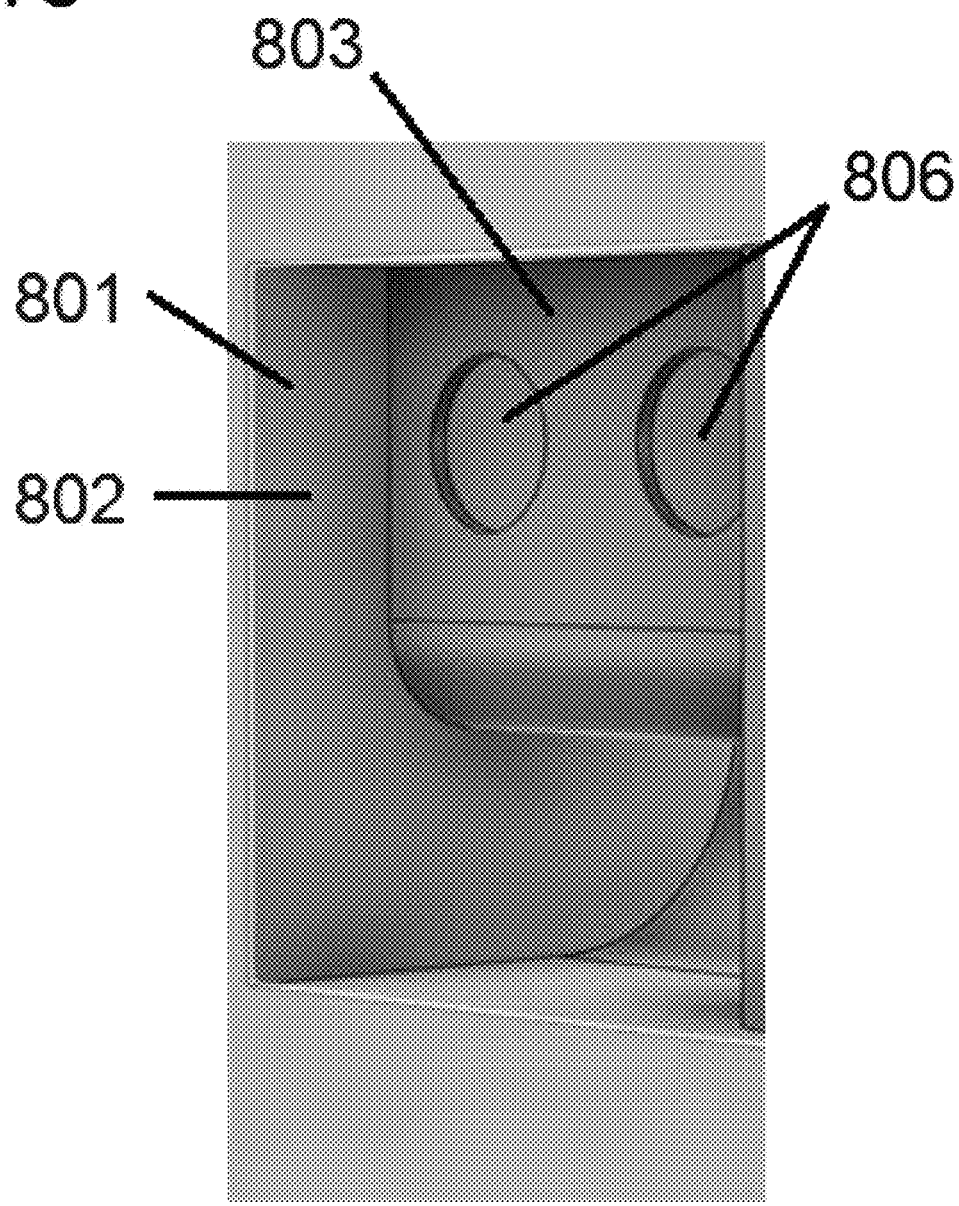
FIG. 45 is a perspective elevation view of a park brake interface module, according to a further embodiment of the present invention.

In applications in which only one parking brake is present, such as a commercial vehicle without a trailer (such as a so-called "box truck"), the vehicle may be provided with a park brake interface module that contains only one fixed switch element in front of a recess, as shown in FIG. 45. This figure shows a park brake interface module 800 having a single switch 801 in a single recess 802, with only the two sensors 806 on each of the front and rear surfaces needed to detect the driver's push or pull force to release or apply the signal parking brake system.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A park brake interface module for a vehicle, comprising:
    at least one fixed park brake switch having a front surface facing outward from the park brake interface module and a rear surface facing a recess in the park brake interface module at a rear side of the at least one fixed park brake interface module,
    wherein the at least one fixed park brake switch is configured to generate a brake release signal in response to a push input from a driver on the front surface and to generate a brake apply signal in response to a pull input from the driver on the rear surface.

2. The park brake interface module of claim 1, wherein the at least one fixed park brake switch is two fixed park brake switches arranged adjacent to one another, and the two fixed park brake switches are configured to signal actuation of different parking brakes.

3. The park brake interface module of claim 2, wherein the two park brake switches are separated by a dividing wall.

4. The park brake interface module of claim 3, wherein the two fixed park brake switches each have at least one sensor configured to detect driver actuation on each of the their respective front surfaces and rear surfaces.

5. The park brake interface module of claim 4, wherein the at least one sensor at each of the front and rear surfaces of the two fixed park brake switches includes two sensors at each of the front and rear surfaces.

6. The park brake interface module of claim 5 further comprising:
    a rear portion configured to support control electronics configured to receive signals from the fixed park brake switches and to issue feedback signals to the fixed park brake switches.

7. The park brake interface module of claim 6, wherein the sensors are one or more of piezoelectric sensors, membrane switches, momentary-contact microswitches, infrared sensors, optical imaging sensors, capacitive and resistive display overlays, temperature sensors, and acoustic pulse recognition sensors.

8. The park brake interface module of claim 7, wherein the sensors are configured to generate driver-detectable feedback signals in response to driver actuation of the fixed park brake switches.

9. The park brake interface module of claim 8, wherein the park brake interface module is configured to be located within reach of a seated driver.

10. The park brake interface module of claim 8, wherein the park brake interface module is configured to be located in a vehicle dash panel.

11. The park brake interface module of claim 8, wherein the park brake interface module is configured to be located adjacent to or within the perimeter of adjacent to vehicle instrument display.

12. A method of actuating a parking brake of a vehicle, comprising the acts of:
    providing at least one fixed park brake switch having a front surface facing outward from the park brake interface module and a rear surface facing a recess in the park brake module at a rear side of the at least one fixed park brake interface module;
    pulling or pushing on the at least one fixed park brake switch;
    generating a parking brake actuation signal in response to the pulling or pushing; and
    actuating a parking brake in response to the parking brake actuation signal,
    wherein
    the at least one fixed park brake switch is two fixed park brake switches arranged adjacent to one another, and the two fixed park brake switches are configured to signal actuation of different parking brakes.

13. The method of actuating a parking brake of a vehicle of claim 11, further comprising the acts of:

in response pulling of the at least one fixed park brake switch, generating a parking brake apply signal; and applying the parking brake in response to the parking brake apply signal.

14. The method of actuating a parking brake of a vehicle of claim 11, further comprising the acts of:

in response pushing of the at least one fixed park brake switch, generating a parking brake release signal; and generating a parking brake release signal in response to the pushing.

15. The method of actuating a parking brake of a vehicle of claim 11, wherein the two fixed park brake switches each have at least one sensor configured to detect driver actuation on each of the front surface and the rear surface, further comprising the act of:

in response to the act of pulling or pushing on one of the two fixed park brake switches, generating using the at least one sensor at the front or rear surface which received the driver's pull or push at least one driver-perceptible feedback signal.

16. The method of actuating a parking brake of a vehicle of claim 12, wherein the driver-perceptible feedback signal is a vibration generated by the at least one sensor at the front or rear surface which received the driver's pull or push.

17. The method of actuating a parking brake of a vehicle of claim 13, wherein the driver-perceptible feedback signal mimics a feel of an air pressure pulse generated by a mechanical pneumatic brake system park brake switch.

18. The method of actuating a parking brake of a vehicle of claim 14, wherein the two fixed park brake switches each have at least two sensors configured to detect driver actuation on each of the their respective front surfaces and rear surfaces.

19. The method of actuating a parking brake of a vehicle of claim 15, wherein parking brake actuation signals generated by the at least two sensors on the front or rear surface pushed or pulled by the driver are received by control electronics, and the control electronics issues a signal to initiate the act of parking brake actuation.

20. The method of actuating a parking brake of a vehicle of claim 16, wherein the control electronics generates a signal to the at least one sensor at the front or rear surface which received the driver's pull or push to initiated the generation of the at least one driver-perceptible feedback signal.

* * * * *